(12) United States Patent
Haatainen et al.

(10) Patent No.: US 6,678,734 B1
(45) Date of Patent: Jan. 13, 2004

(54) METHOD FOR INTERCEPTING NETWORK PACKETS IN A COMPUTING DEVICE

(75) Inventors: Niko Haatainen, Kuopio (FI); Tero Kivinen, Espoo (FI); Jussi Kukkonen, Helsinki (FI); Tatu Ylönen, Espoo (FI)

(73) Assignee: SSH Communications Security Ltd.

( * ) Notice: Subject to any disclaimer, the term of this patent is extended or adjusted under 35 U.S.C. 154(b) by 0 days.

(21) Appl. No.: 09/439,419

(22) Filed: Nov. 13, 1999

(51) Int. Cl.$^7$ .............................................. G06F 15/16
(52) U.S. Cl. ..................... 709/230; 709/203; 709/245
(58) Field of Search ................................ 709/200–203, 709/217, 219, 230, 238, 250, 243, 224; 713/201; 370/353, 248

(56) References Cited

U.S. PATENT DOCUMENTS

| | | | |
|---|---|---|---|
| 5,774,660 A | 6/1998 | Brendel et al. | 395/200.31 |
| 5,781,550 A | 7/1998 | Templin et al. | 370/401 |
| 5,786,770 A * | 7/1998 | Thompson | |
| 5,822,520 A * | 10/1998 | Parker | 709/230 |
| 5,862,362 A | 1/1999 | Somasegar et al. | 395/500 |
| 5,983,274 A * | 11/1999 | Hyder et al. | 709/230 |
| 6,026,086 A * | 2/2000 | Lancelot et al. | 370/353 |
| 6,085,234 A * | 7/2000 | Pitts et al. | 709/217 |
| 6,111,894 A * | 8/2000 | Bender et al. | 370/469 |
| 6,226,680 B1 * | 5/2001 | Boucher et al. | 709/230 |
| 6,272,551 B1 * | 8/2001 | Martin et al. | 709/250 |
| 6,289,388 B1 * | 9/2001 | Disney et al. | 709/238 |
| 6,295,554 B1 * | 9/2001 | Karadogan et al. | 709/219 |
| 6,363,423 B1 * | 3/2002 | Chiles et al. | 709/224 |
| 6,366,958 B1 * | 4/2002 | Ainsworth et al. | 709/230 |
| 6,473,406 B1 * | 10/2002 | Coile et al. | 370/248 |

OTHER PUBLICATIONS

WindowNT server 4 Unleased. www.netexpo.nl/does/nt_unleased/ch03.htm, May 1999.*
Huang et al, USENIX, www.usenix.org, 1998.*

* cited by examiner

Primary Examiner—Mark R. Powell
Assistant Examiner—Thong Vu
(74) Attorney, Agent, or Firm—Ronald Craig Fish; Ronald Craig Fish, A Law Corporation

(57) ABSTRACT

A method is provided for intercepting network packets in a computer system, where a number of functions are used to communicate network packets between a network adapter and a protocols entity. A first network adapter and a first protocols entity installed in the computer system are identified. A set of replacement functions is provided within a packet interceptor module. At least one function used for transmitting network packets from said first protocols entity to said first network adapter is hooked into a first replacement function. At least one function used for transmitting network packets from said first network adapter to said first protocols entity is hooked into a second replacement function. At least one function used for receiving information about the status of the network interface implemented by said first network adapter is hooked into a third replacement function.

47 Claims, 11 Drawing Sheets

METHOD FOR INTERCEPTING NETWORK PACKETS IN A COMPUTING DEVICE

TECHNOLOGICAL FIELD

The invention relates to the field of handling data packets that are transmitted over a network. Especially the invention concerns the subject of intercepting data packets, i.e. providing access to essentially all data packets sent and received by a certain system.

BACKGROUND OF THE INVENTION

The growth of the Internet and its use for new applications have made it beneficial to introduce new services that affect the way network packets are transmitted through a network. Examples of products and services with such needs include:

Network-level encryption applications, such as VPNs (Virtual Private Networks), as described for example in the reference marked as SWE98 in the enclosed list of references. All of the enclosed list of references is hereby incorporated by reference. These applications encrypt and decrypt data packets as they are transmitted in and out of a system to provide security for the data in transmission. VPNs are essential for reliably conducting commercial activity (buying and selling) through a publicly available packet-switched data transmission network such as the Internet, and for using Internet for mission-critical business applications.

Firewalls, as described for example in the reference marked as CB94 in the enclosed list of references. These are network security devices that filter network traffic according to specified criteria, allowing only some packets to pass through. Firewalls are usually implemented as extensions to general-purpose operating systems, so that they can monitor and alter traffic flowing through the system, but may also be implemented as dedicated hardware devices.

Intrusion detection and packet sniffing. Many intrusion detection and network monitoring tools need access to the data transmitted in packets through a network. Similar tools are also used to collect statistics about network traffic (e.g. as described in the reference marked as Waldbusser97 in the enclosed list of references).

Multimedia applications. It is predicted that 25% of the global telecommunications market value will be IP-based (where IP comes from Internet Protocol) in just a couple of years, and much of the required data traffic will be transmitted over the public Internet using general-purpose computers as terminals. Guaranteed QoS (Quality of Service) is essential for interactive video and audio applications over such networks, as described for example in the reference marked as SCFJ96 in the enclosed list of references.

Mobility of terminals. Mobility is becoming increasingly important also for packet-switched data transmission networks and the Internet, as described for example in the reference marked as Perkins96 in the enclosed list of references. In many cases, mobility support will be provided as added value to an existing system, and it will require the capability of modifying and redirecting incoming and outgoing data packets.

All of the above mentioned applications use specific protocols that are not available in all widely used operating systems. In many cases, vendors will want to provide support for these services on widely installed platforms for which no support for them is readily available. Implementing such support often requires that the implementor gets access to all data packets sent and received by the system. The module that provides such access is called a packet interceptor. Such modules typically also provide some information about the available network interfaces and their configuration (e.g. network addresses) to the application. The application in turn usually consists of a kernel-mode component that handles real-time packet processing, and a normal user-mode application for management and other functions that are not time-critical and/or require user interaction.

Overall, the need for intercepting packets flowing in and out of a system is becoming extremely important. This has been recognized by programmers and commercial operators in the field, as well as operating system vendors such as Microsoft Corporation. A substantial amount of work is made to implement packet interception functionalities in networking systems and related products.

Existing solutions for the packet interception problem fall mostly into the following categories A), B) and C):

A) Intermediate drivers. A TCP/IP (or other) protocol stack, where TCP/IP comes from Transmission Control Protocol/Internet Protocol, is usually layered so that network device drivers provide a standard interface to a particular hardware device known as a network adapter, and protocol stacks implement various network protocols. The protocol stacks are made hardware-independent by the standard interface, which the device drivers must implement. In Windows operating systems, where Windows is a registered trademark of Microsoft Corporation, this interface is called NDIS (Network Driver Interface Specification), as described for example in the reference marked as Win4DDK in the enclosed list of references. In Sun Solaris, which refers to the registered trademarks Sun, Solaris and Sun Solaris of Sun Microsystems, similar functionality is provided by the STREAMS interface, as described for example in the reference marked as STREAMS93 in the enclosed list of references.

Intermediate drivers are readily supported under at least Microsoft Windows NT 4.0 (registered trademark of Microsoft) and Sun Solaris operating systems. Microsoft has even provided sample code for developing intermediate drivers for applications such as those described above. At least two such samples are available, and many vendors have implemented products based on this technology.

B) WINSOCK interception. It is well known in the industry that several products replace the WINSOCK.DLL, as described for example in the references marked as Bonner96 and QS96 in the enclosed list of references. WINSOCK.DLL is a file on Windows systems. Some products use intermediate drivers at the LSP (Layered Service Providers) level, as described for example in the reference marked as Win4DDK in the enclosed list of references. Microsoft has also published sample code for intercepting traffic at this level.

C) External devices outside the operating systems. There are hardware products that are essentially small boxes attached to the back of the computer, or even embedded on network adapters, that see all network traffic going through them. Such devices have been used at least in security applications to implement functionality that could alternatively be done by intercepting traffic in the operating system.

The known solutions that fall into the above-mentioned categories A) to C) have not provided good, high-performance, robust solutions that would work on all widely used operating systems. In particular, many vendors have found it extremely difficult to develop packet interceptors for the Windows 95 and Windows 98 operating systems, which are currently very widely used and will remain so for several years to come.

Almost all software products that perform packet interception use intermediate drivers to perform the interception. FIG. 1 is a simplified block diagram that illustrates the known use of an intermediate driver especially in association with a Windows NT operating system. At the top of FIG. 1 there is an application program that has a user-mode client part 101. Between it and a network protocols block 106 there may be intermediaries which are of little significance to the present invention. The network protocols block 106 implements the network protocols, for example the TCP/IP protocol stack. The intermediate driver 107 resides between the protocol stacks and a NIC driver 108; it is separated from them through the NDIS interface the parts of which are separately shown in FIG. 1 as 102 and 103. The NIC driver block 108 is arranged to directly manage a NIC or Network Interface Card 109. The latter is a hardware component, usually an extension board coupled to the internal parallel bus of a computer. The NIC driver 108 may be referred to more generally as a network adapter. The NIC driver 108 allows upper layers to send and receive packets through the network and to perform control operations like handling interrupts, resetting or halting the interface card 109. It also allows the upper layers to query and set the operational characteristics of itself. The network adapter (i.e. the NIC driver 108) sees the intermediate driver 107 as if it was a protocol, and to the protocols block 106 the intermediate driver 107 behaves like a network adapter. The same NDIS interface is used on both sides of the intermediate driver, i.e. between blocks 106 and 107 on one hand and between blocks 107 and 108 on the other hand. The network interface card 109 is coupled to at least one physical transmission medium 110, which may be for example an optical fiber cable, a coaxial cable or a twisted pair of wires.

The intermediate driver approach works well for Windows NT and Solaris, which have been the principal platforms for Firewall and VPN applications. However, within the last year there has also been increased attention on implementing similar functionality in other operating systems, particularly Windows 95 and Windows 98. However, developing intermediate drivers for these systems has turned out to be extremely challenging.

A major problem in programming such drivers for these systems has been support for dial-up interfaces, as described for example in the reference marked as Simpson94 int eh enclosed list of references. A dial-up interface uses a serial port and modem to connect to the Internet or other network over the telephone network. Such interfaces are characterized by dynamic network addresses and the network connection being available only part of the time. The connection goes up (into an active, connected state) and down (into a passive, disconenctd state) as the user connects and disconects the link.

The biggest problem for writing interceptors for dial-up interfaces has been that Windows 95, Windows 98 and Windows NT use a Microsoft proprietary extensions to the NDIS interface to provide the added functionality needed for dial-up functionality and dynamic addresses. Microsoft employees have recommended that packet interception should not be implemented for these platforms, because of the nature of the proprietary interface. Many people have been known to try to write intermediate drivers for these platforms without success or with limited success only after years of reverse engineering and development.

A few companies have managed to implement intermediate drivers even for these platforms. However, very recently, intermediate drivers have also been found to have reliability problems. The drivers have not worked with all network adapters or all versions of the operating systems, and as more vendors are bringing products using intermediate drivers to the marketplace, people are experiencing serious compatibility problems between intermediate drivers from different vendors installed in the same computer. Getting the different intermediate drivers to bind to each other in the correct order is a hard, possibly unsolvable problem. These issues may eventually cause intermediate drivers to be too unreliable for general use.

A further problem with intermediate drivers is performance. The intermediate drivers add a substantial amount of processing to the data path of a network packet. Significant amounts of data copying may also take place. Thus, packet interception through the use of intermediate drivers is becoming an important performance bottleneck for large-volume applications. The NDIS library implements also some locking strategy on behalf of the intermediate drivers, which is likely to add overhead and causes protocol-intermediate-NIC code paths to be effectively half-duplex. This is especially bad for routing applications.

SUMMARY OF THE INVENTION

It is an object of the present invention to provide a method and arrangement for packet interception that would be widely compatible with different network adapters, different operating systems, different operating system versions and various third party software. It is an additional object of the invention to provide such a method and arrangement with the additional advantage of being easily adopted to use even by relatively unskilled users.

The objects of the invention are achieved by using a method we call hooking in a sophisticated fashion to get access to all the necessary packets and information related to them, and by providing an arrangement that is programmed to implement such a method.

In its first embodiment the method according to the invention comprises the steps of
- providing a set of replacement functions within a packet interceptor module;
- hooking at least one function used for transmitting network packets from a first protocols entity to a first network adapter into a first replacement function;
- hooking at least one function used for transmitting network packets from said first network adapter to said first protocols entity into a second replacement function; and
- hooking at least one function used for receiving information about the status of the network interface implemented by said first network adapter into a third replacement function.

In a second embodiment the method according to the invention comprises the steps of
- providing a set of replacement functions within a packet interceptor module;
- hooking a plurality of functions used for transmitting network packets from protocols entities to network adapters into a first set of replacement functions;
- hooking a plurality of functions used for transmitting network packets from network adapters to protocols entities into a second set of replacement functions; and
- hooking a plurality of functions used for receiving information about the status of the network interfaces implemented by network adapters into a third set of replacement functions.

In a third embodiment the method according to the invention comprises the steps of replacing a first operating system module with a certain first replacement module that implements a programming interface equal to a programming interface of the first operating system module and calls said first operating system module from a plurality of the entry points of the programming interface;

using said replacement module to identify at least one network adapter and at least one protocols entity installed in the computer system;

using said replacement module to replace at least one function used for transmitting network packets from said first protocols entity to said first network adapter;

using said replacement module to to replace at least one function used for transmitting network packets from said first network adapter to said first protocols entity;

using said replacement module to replace at least one function used for receiving information about the status of the network interface implemented by said first network adapter;

using said replacement module to determine, whether or not a dynamic IP address has been allocated for the network interface implemented by said first network adapter; and in a case where a dynamic IP address has been allocated for the network interface implemented by said first network adapter, using said replacement module to determine, which said dynamic IP address is.

Additionally the invention concerns a computer system for handling network packets, comprising a first network adapter arranged to implement a network interface;

a first protocols entity;

a number of predetermined functions for communicating network packets between said network adapter and said protocols entity;

a packet interceptor module for determining a set of replacement functions;

within said packet interceptor module, means for hooking at least one function used for transmitting network packets from said first protocols entity to said first network adapter into a first replacement function;

within said packet interceptor module, means for hooking at least one function used for transmitting network packets from said first network adapter to said first protocols entity into a second replacement function; and within said packet interceptor module, means for hooking at least one function used for receiving information about the status of the network interface implemented by said first network adapter into a third replacement function.

In an even further embodiment the invention concerns a packet interceptor module for intercepting network packets in a computer system which comprises a first network adapter, a first protocols entity and a number of predetermined functions for communicating network packets between said network adapter and said protocols entity; said packet interceptor module comprising the definition of a set of replacement functions;

means for hooking at least one function used for transmitting network packets from said first protocols entity to said first network adapter into a first replacement function;

means for hooking at least one function used for transmitting network packets from said first network adapter to said first protocols entity into a second replacement function; and means for hooking at least one function used for receiving information about the status of the network interface implemented by said first network adapter into a third replacement function.

BRIEF DESCRIPTION OF DRAWINGS

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1:
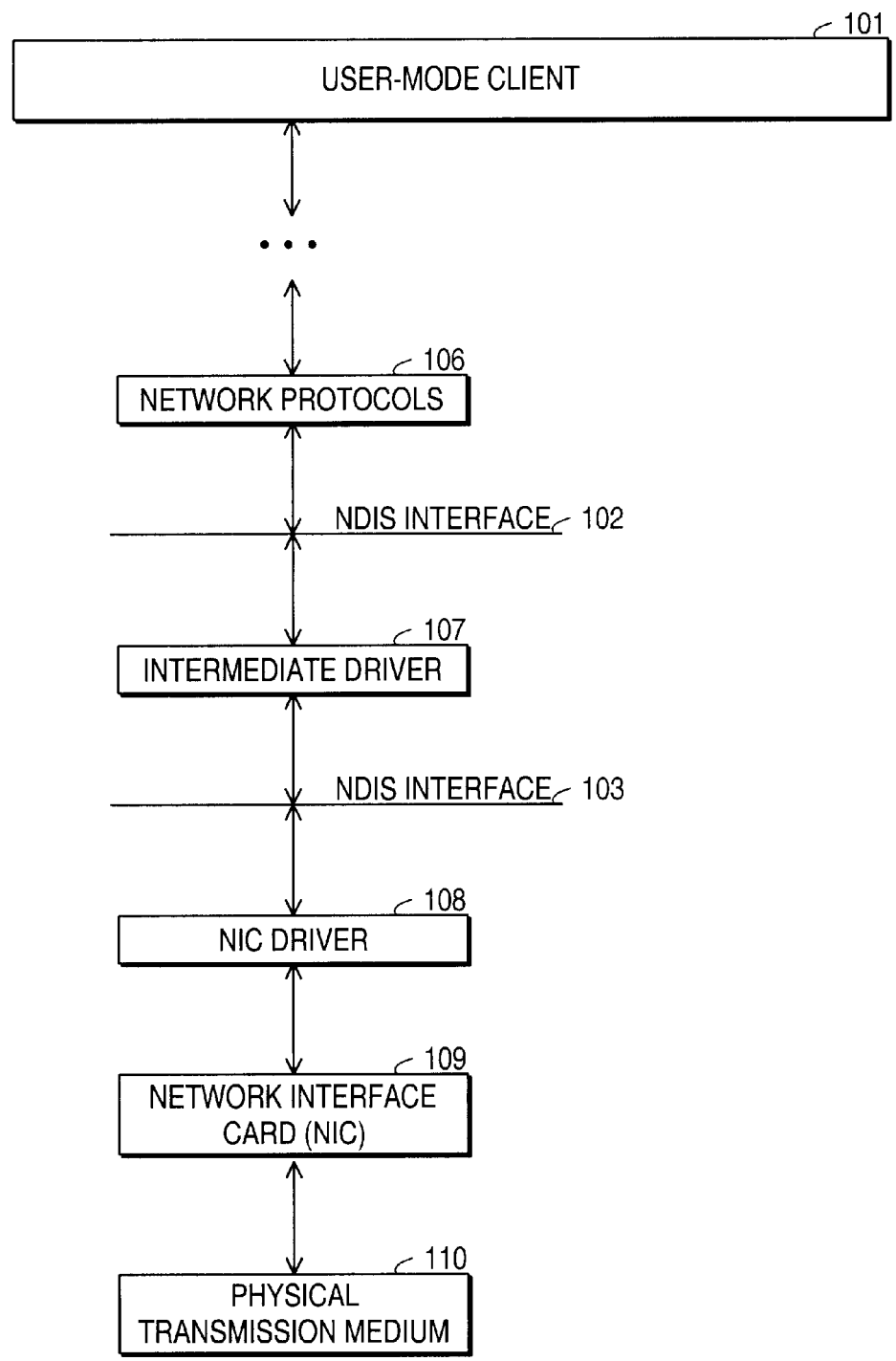
FIG. 1 illustrates the known concept of intermediate drivers.

The concept of hooking is generally known in the art of computer programming. It means that a call to a default system service (like a function, interrupt or memory location) is redirected or "hooked" into a replacement service instead. For example, the MSDOS (MicroSoft Disk Operating System) operating system provided a system call to redirect interrupts, as described for example in the reference marked as MSDOS5 in the enclosed list of references. Many object-oriented languages provide a way of redefining functions in derived classes (e.g., C++ virtual functions, reference marked as ES90). Lisp-like programming languages have supported hooks for certain operations for a long time, as described for example in the reference marked as Steele90.

Many operating systems provide hooks or certain other types of redirecting for limited functionality. For example the known firewall hooks in Linux and FreeBSD are typically exploited so that a module of code is loaded into the kernel. The module registers itself to the networking code, and the networking code will call the module whenever a packet is sent or received. The code within the module will then indicate whether the packet should be allowed through or not. Typically, however, such hooking implementations do not allow modifying, inserting, and delaying packets.

The firewall hooking approach is only available for a very limited range of operating systems, such as Linux and FreeBSD. Furthermore, on many operating systems the functionality may not be enabled by default. Thus, using the firewall hooking features may require the user to recompile and install a new operating system kernel, which exceeds the skills of most system administrators. Therefore the known firewall hooking solutions are not generally usable and do not solve the problem of providing packet intercepting for the most popular operating systems or for large numbers of unskilled users.

Specialized applications such as anti-virus software have trapped system services to monitor e.g. file system activity. Some operating systems provide special support for such applications. For example, the Windows 95 operating system provides a VMM. VxD. Hook_Device_Service function for hooking device services for such applications, as described for example in the reference marked as Win95DDK in the enclosed list of references.

Another known method for inspecting network traffic is to replace the known WINSOCK.DLL file on Windows. This file does not see individual data packets, but instead gets access to each Windows SOCKET on the system. It is possible to move the original file aside and replaced it by a new DLL so that the new DLL calls the original one. In known systems, the replacement has been performed at installation time, and the replacement module has been loaded when an application using it starts (not, e.g., when the system boots). Although conceptually somewhat related to hooking, this method is not directly applicable to packet interception because access to packets is not obtained.

The very basic idea of using hooking to get access to network packets is known, as described for example in the references marked as Lanciani98, Lanciani98PPPMAC and Lanciani98Reply in the enclosed list of references. It has been used in certain protocol conversion applications. The known prior art in this area consists of a program that implements the packet driver programming interface on top of the NDIS programming interface, as described for example in the reference marked as Lanciani97NDIS3PKT in the enclosed list of references. Other known alternatives are the implementation of an ODI packet driver over NDIS (reference Lanciani96ODIPKT3.1), an older packet driver interface (reference Lanciani92DIS_PKT), a Banyan Vines packet driver (reference Lanciani94IBANPKT), and a NFS client for Windows (reference Lanciani97NFSTDI). However, a protocol conversion or an alternative packet driver can not support sophisticated network security applications; they can even complicate the use of security arrangements since they may cause unexpected and disallowed changes in the form of the packets.

The present invention applies the general idea of hooking into intercepting both incoming and outgoing packets, and obtaining and modifying required information about the system. The main application of the invention is a complete packet interceptor method that uses hooking in a sophisticated fashion to get access to all the necessary packets and information.

The use of hooking in accordance with the invention is a new approach to the problem that other people are currently trying to solve by writing intermediate drivers. The new method completely avoids the need to write an intermediate driver or reverse-engineer proprietary protocols in the operating system. The amount of code needed to implement the new method appears to be about half of that needed for an intermediate driver. Furthermore, the approach according to the invention can often be used even when there is no support for interception whatsoever in the host operating system. The new method is simpler, more robust, and provides better performance than intermediate drivers. Simplicity comes from the fact that there is always a way to do hooking even when there is no built in support. Hooking is more robust than the intermediate driver approach because hooking will always work or can be made to work whereas an intermediate driver will not always work and cannot always be made to work. Better performance comes from the fact that there is only half the code to run so it is faster; additionally the replacement function to which a certain procedure is hooked can be written in a way that is most optimal just for packet intercepting purposes, whereas the intermediate driver approach has to rely on the original functions which are for general purpose and not usually optimized for packet intercepting. Hooking also provides more reliable interoperability with various third party software packages and drivers.

Figure 2A:
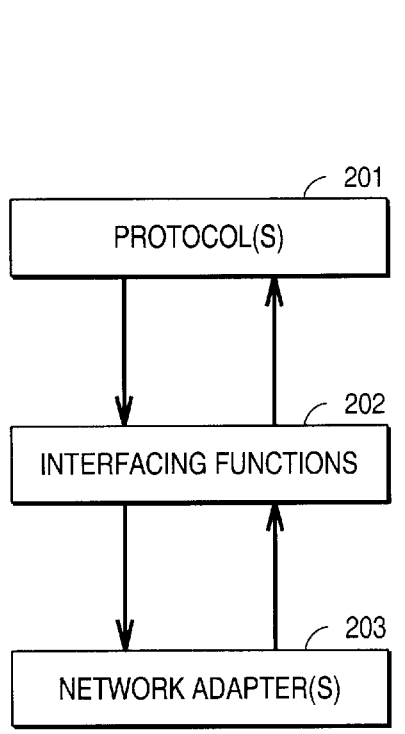
FIGS. 2a, 2b and 2c compare schematically a first embodiment of the invention against prior art.
Figure 2B:
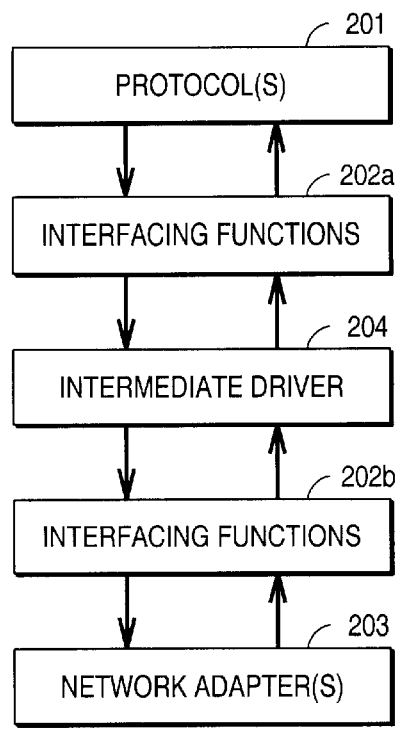

FIG. 2a shows schematically a prior art network interface arrangement without a packet interceptor. A protocol block 201 is complemented by an interfacing functions block 202, which in turn offers a standard interface to one or more network adapters 203. In FIG. 2b a prior art packet interceptor has been implemented as an intermediate driver 204 so that there is a first interfacing functions block 202a between it and the protocol block 201 and a second interfacing functions block 202b between it and the network adapter(s) 203. The interfacing functions refer to the NDIS interface within a Microsoft Windows environment and to the STREAMS interface within a Sun Solaris environment.

Figure 2C:
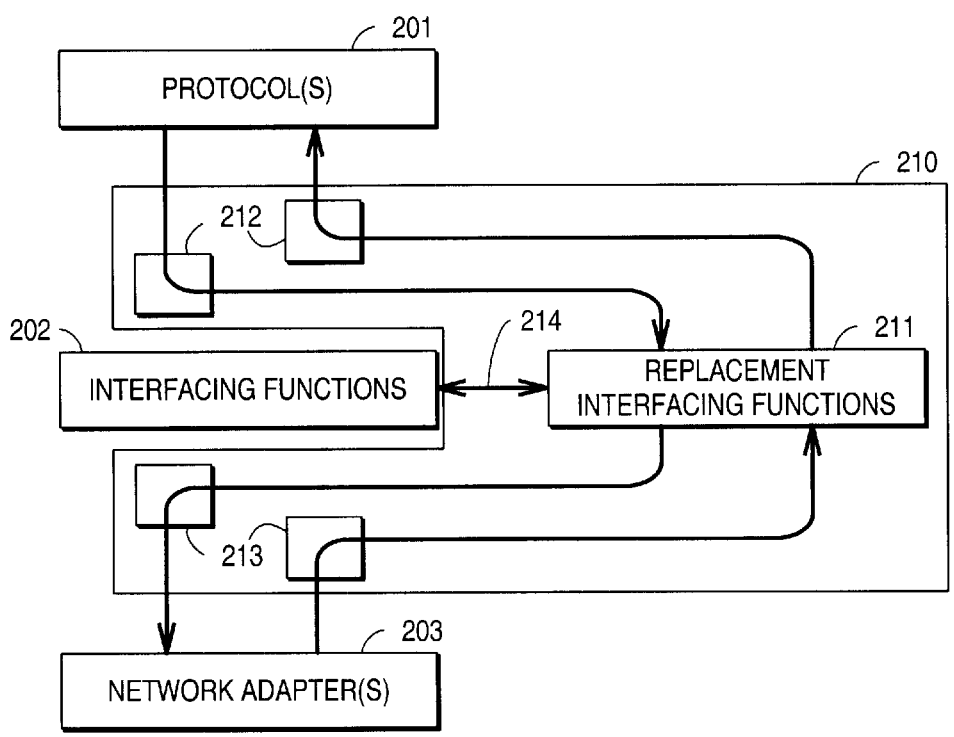

In FIG. 2c a simplified arrangement according to the present invention is shown. The packet interceptor module 210 comprises a set of replacement functions 211 which are arranged to at least partly replace the original interfacing functions 202. Additionally the packet interceptor module 210 comprises upper hooking means 212 and lower hooking means 213 to redirect the appropriate communication which was aimed at the original interfacing functions 202 to the replacement functions in block 211, and to return the packets, calls and other forms of communication into the original signal path after processing. Most advantageously the packet interceptor also comprises means for communicating information between the original interfacing functions and their replacements, as is shown by arrow 214.

The following description begins by illustrating a first preferred embodiment of the invention in the Windows 95 and Windows 98 environments with reference to FIGS. 3 to 9. In this embodiment, the interceptor can be used to inspect and modify both received and transmitted packets on these operating systems. The interceptor module (also containing the code to actually inspect and modify the packets) is built into a VxD device driver module, the formal requirements of which are generally known. The "driver" which is actually an interceptor module is installed in the system preferably as a static device driver that is after the NDIS module but before network adapters in load order. The following steps illustrate how the module implements the method in this invention. It should be noted that the steps decribed herein are not limiting in the sense that they can be rearranged or intermixed in many ways (unless otherwise specified) while still staying within the scope of this invention.

Figure 3:
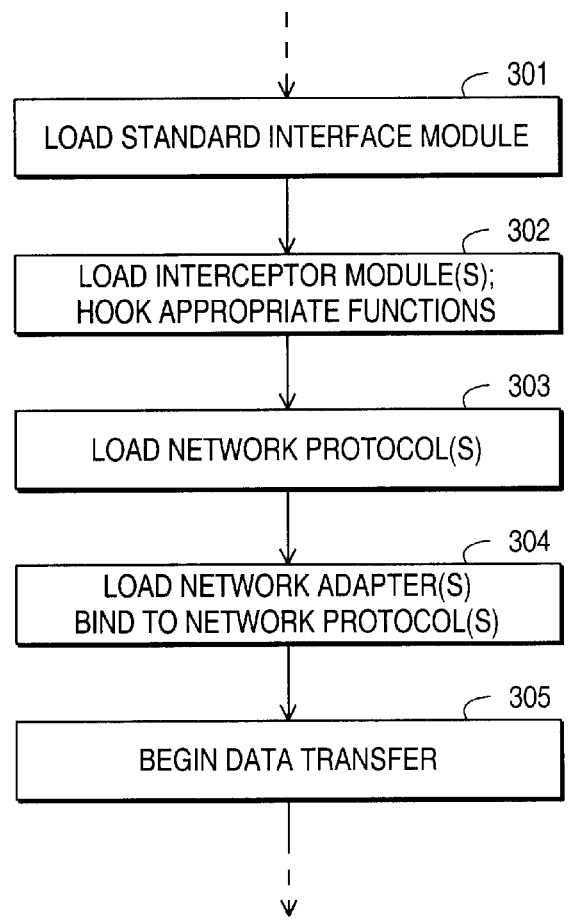
FIG. 3 illustrates in general the steps required to apply the first embodiment of the invention.

We will presume that a computer system runs on a Windows 95 or Windows 98 operating system, or another operating system that relies on a standard interface and a respective collection of functions and handlers between protocol stacks and network adapters. We will further presume that an NDIS module or a corresponding entity defining a standard interface between protocol stacks and network adapters has been loaded at some previous step of initializing or operating said computer system. The loading of the NDIS module is illustrated in FIG. 3 as step 301.

Figure 4:
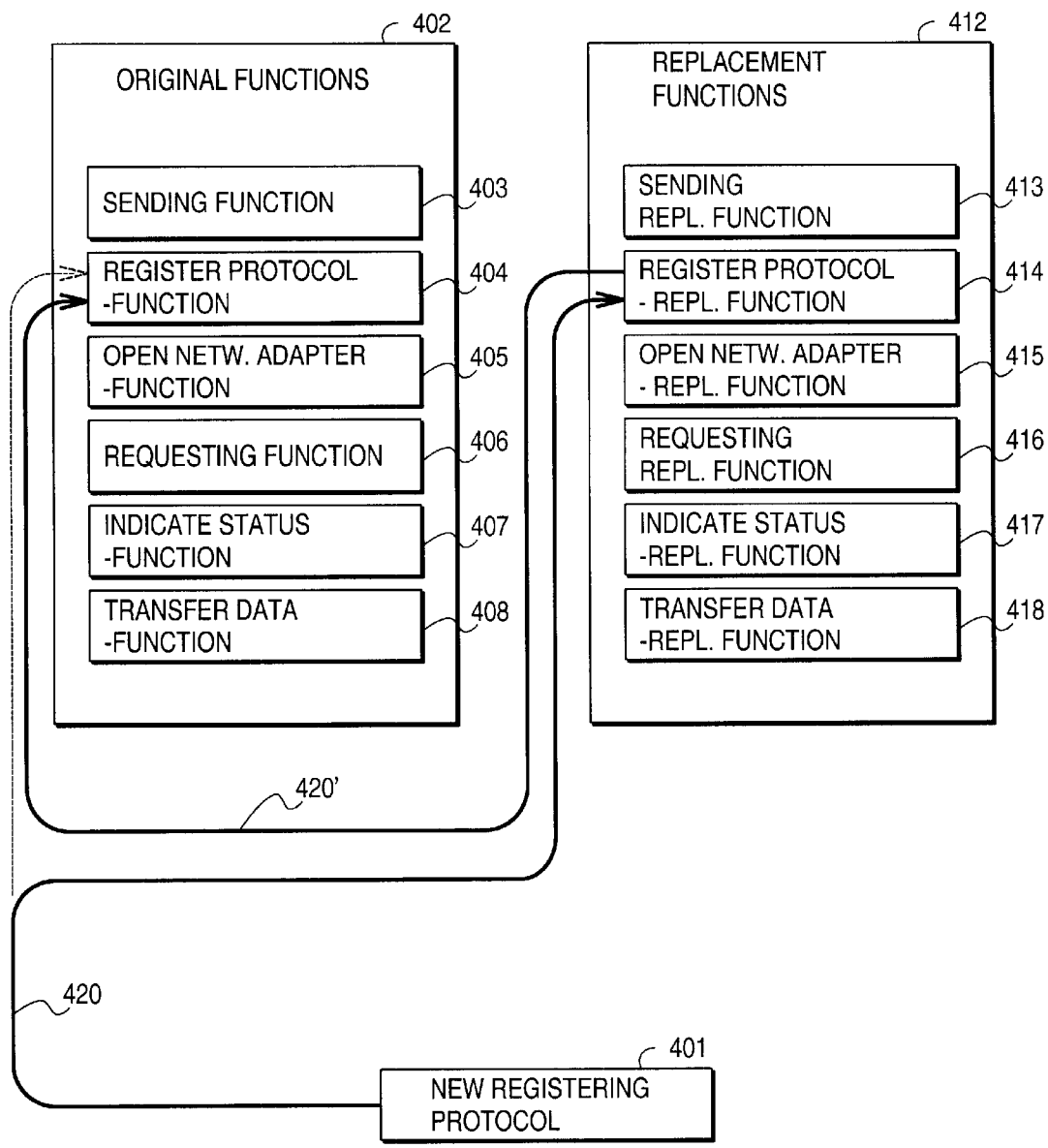
FIG. 4 illustrates the registration of a protocol.

At step 302 a packet interceptor module which has the form of a device driver is first initialized, preferably using a so-called SYS_Critical_Init function of the module. The module redirects (hooks) the calls to certain standard functions on the interface referred to above to its own functions. In FIG. 4 the functions to be hooked are shown as a sending function 403, a protocol registering function 404, an adapter opening function 405, a request function 406, a status indication function 407 and a data transfer function 408. Taken that the interface is NDIS, these functions are the known NdisSend, NdisRegisterProtocol, NdisOpenAdapter, NdisRequest, NdisIndicateStatus, and NdisTransferData functions respectively. Further at step 302 the packet interceptor module saves the original addresses of said functions 403 to 408. The Windows 95 operating systems provides a generic Hook_Device_Service operation in assembly language that can be used to do the hooking conveniently. The following sample code illustrates its use.

```
; Hook NDISRegisterProtocol
GetVxDServiceOrdinal eax, NDISRegisterProtocol
mov esi, OFFSET32_ssh_ndisregisterprotocol_handler@16
VMMCall Hook_Device_Service
jc not_hooked
mov [__ssh_orig_ndisregisterprotocol_fn], esi
```

The function of the code should be understandable to anyone experienced in writing Windows 95 VxD drivers in assembly language. The reference designated as Win95DDK in the appended list of references explains the called system services.

For the hooking to work correctly, the packet interceptor module 412 should be loaded after the NDIS module (step 301) but before network adapters and protocols (steps 303 and 304). The packet interceptor module 412 can appear e.g. as a static VxD driver with the appropriate load order, configured in a INI file or registry.

After step 302 the system starts loading network protocols and adapters in steps 303 and 304. Each protocol to be loaded at step 303 should register itself by calling the appropriate protocol registering function, which within the NDIS framework means the NdisRegisterProtocol function. In FIG. 4 the protocol to perform registration is shown as 401. However, because the hooking of this and other relevant functions was performed at step 302, the call 420 originally aimed at function 404 gets redirected to the corresponding replacement function 414 that was the target of the hooking.

Figure 5:
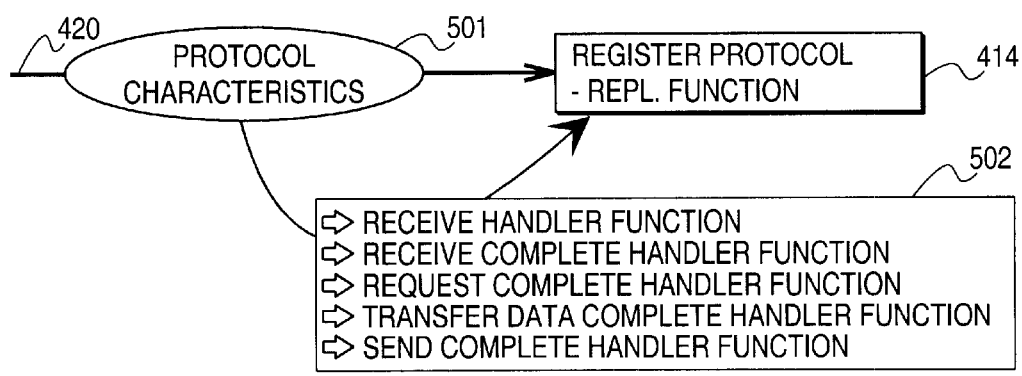
FIG. 5 illustrates some details of a function call.
Figure 6:
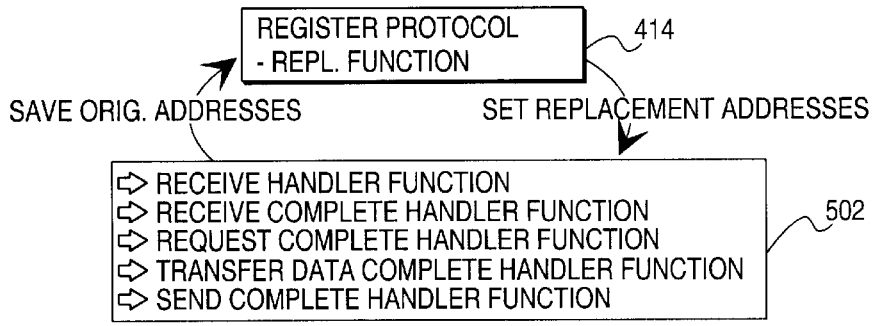
FIG. 6 illustrates the handling of the details in FIG. 5.
Figure 7:
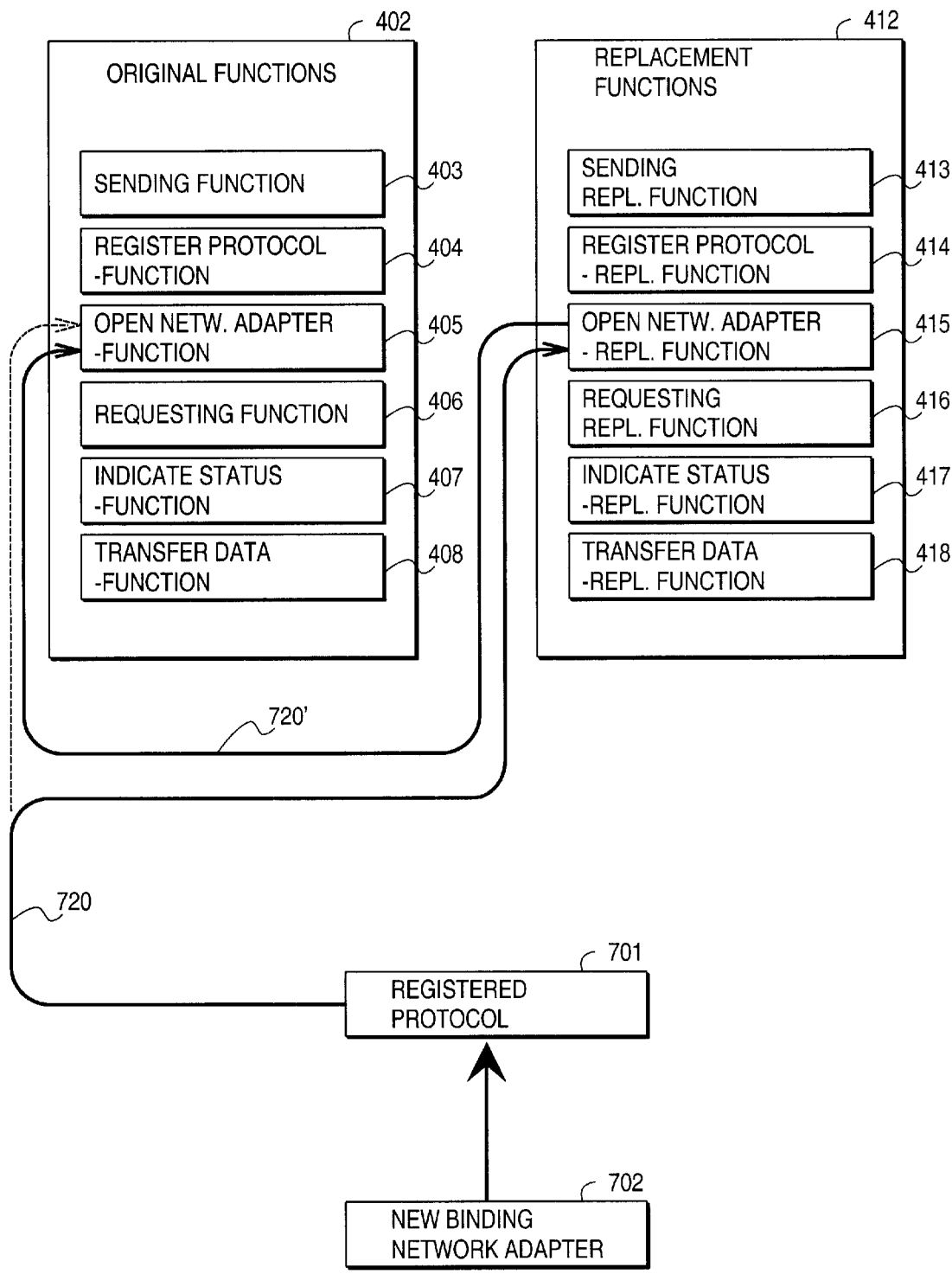
FIG. 7 illustrates the binding of a network adapter.

FIG. 5 illustrates schematically how the replacement implementation 414 of the original protocol registering function receives, as a part of the call 420, a certain data structure 501 describing the relevant protocol characteristics of the calling protocol. Within the NDIS framework this is the NDIS_PROTOCOL_CHARACTERISTICS structure. The function 414 retrieves from this structure preferably a number of pointers to some further related functions 502; again taken that NDIS is concerned, these are the ReceiveHandler, ReceiveCompleteHandler, RequestCompleteHandler, TransferDataCompleteHandler, and SendCompleteHandler functions. FIG. 6 shows schematically how the replacement function 414 saves the original addresses of the functions indicated in structure 502 in its own data structures, and replaces the function pointers in structure 502 by ones that point to corresponding replacement functions. The exact set of functions to be replaced depends on the operating system, and even within the NDIS framework on the NDIS version. The exemplary functions shown in structure 502 are only some of the functions required by NDIS.

FIG. 4 additionally shows how the original NdisRegisterProtocol function is then called to continue the registration. The call 420' differs from the original call 420 sent by the registering procotol 401 in that the pointers to the related functions, shown in structure 502 in FIG. 5, have been replaced with pointers to corresponding related replacement functions. If the registration succeeds, the returned protocol handle is also saved within the data structures of the replacement function 414.

As a result of these steps, the protocol 401 has been otherwise normally registered to the system, but the functions that will be called e.g. when packets are received from network adapters actually point to replacement functions.

After a protocol has been registered, one or more network adapters may bind to it. This is controlled by the system and schematically shown in FIG. 7. Whenever such binding happens, the protocol 701 to which the network adapter 702 should bind calls the adapter opening function 405 (in NDIS: the NdisOpenAdapter function) for the adapter. This call 720 was hooked, and a replacement function 415 gets called instead. The replacement 415 calls the original function 405, and saves information about the binding in its own data structures (not separately shown in FIG. 7). The replacement function 415 can request information from the adapter 702, such as its type or link-layer address. It can also determine whether the adapter is a dial-up adapter. One way to determine this is to compare its Ethernet address against 44:45:53:54:00:00, which is used by Windows for dial-up adapters. Windows dial-up adapters look otherwise like Ethernet (IEEE 802.3) adapters. In general, the adapter opening functions (in NDIS: the NdisOpenAdapter) are a way the interceptor 412 gets information about the available network interfaces.

The replacement function 416 may arrange to intercept request calls and replies (in NDIS: NdisRequest calls and replies), and recognize certain requests. For example, it can adjust MTU (Maximum Transmission Unit; described for example in the reference marked as Postel81 in the enclosed list of references) values returned by the adapter before they are passed to the protocol, so that AH and ESP headers, as described for example in the reference marked as KA98 in the enclosed list of references, can be added to the packet without having to fragment the packet before it is passed to the link layer.

Data transfer through a certain network adapter can begin after the corresponding adapter opening function (in NDIS: the NdisOpenAdapter) has completed.

Figure 8:
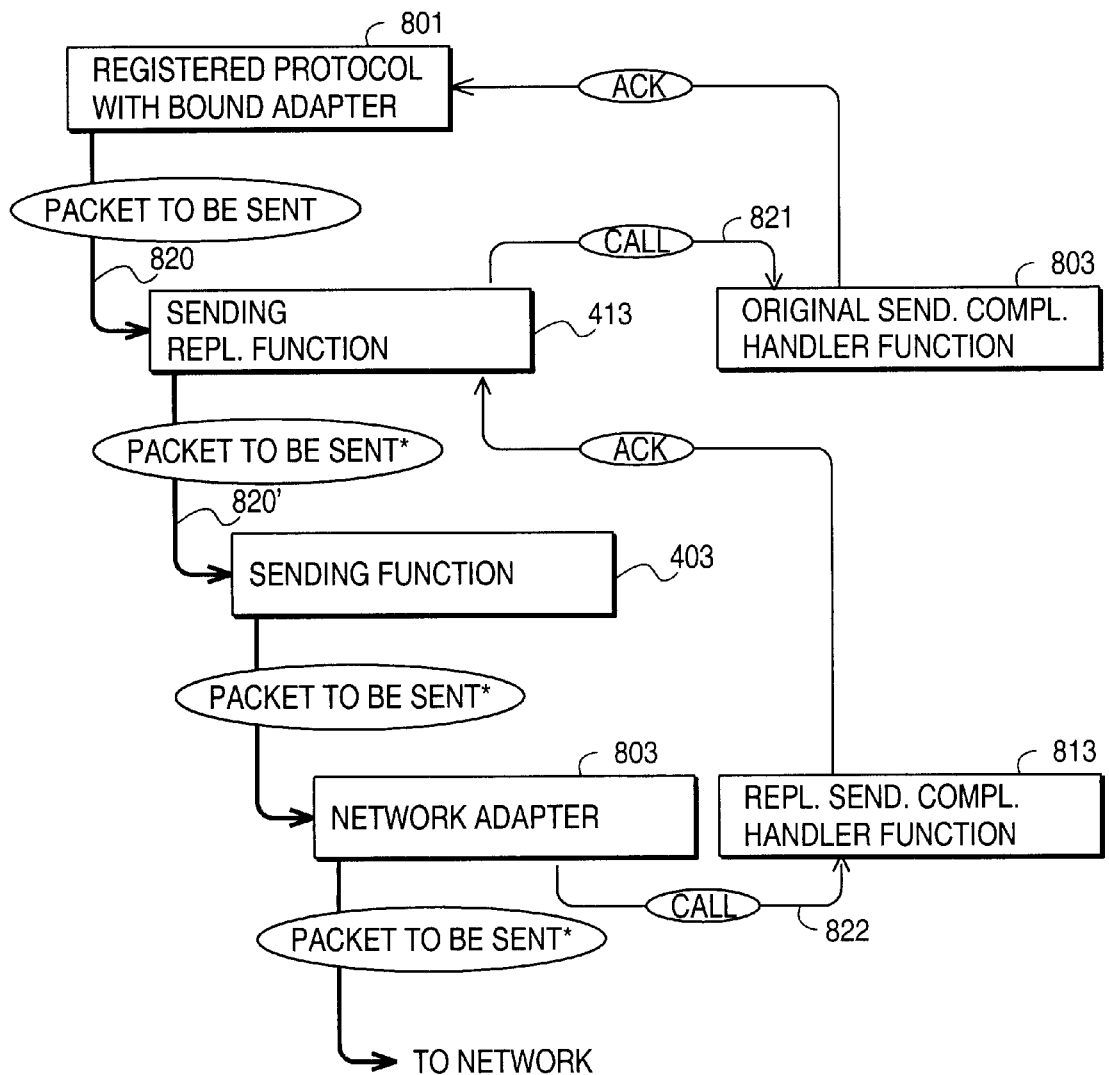
FIG. 8 illustrates the handling of an outgoing packet.

FIG. 8 shows how an outgoing packet proceeds from a protocol 801 into the replacement sending function 413, which in NDIS is the NdisSend function, of the packet interceptor. The packet is taken into custody of the interceptor, and the interceptor calls the original sending complete handler function (in NDIS: SendCompleteHandler) 803 to tell the protocol 801 that the packet 802 has been processed. Alternatively, the interceptor can defer the call 821 to the original sending complete handler function 803 until the packet has been fully processed. Real processing of the packet can take place at this time.

The interceptor sends outgoing packets to network adapters by calling the original sending (in NDIS: NdisSend) function 403 according to arrow 820'. An asterisk shows in FIG. 8 that the packet has gone through the interceptor. If the call completes immediately, the packet can be freed. Otherwise, the adapter will eventually call the replacement sending complete handler function (in NDIS: SendCompleteHandler) 813 (see arrow 822), which will free the packet.

Figure 9A:
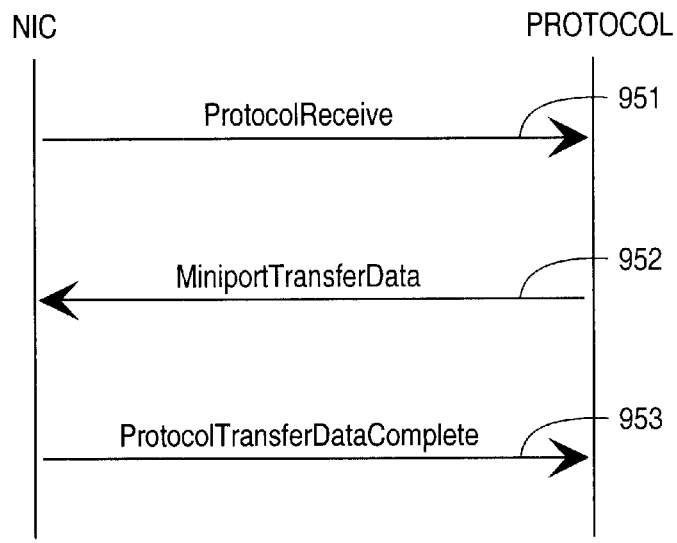
FIG. 9a illustrates a known way of handling of an incoming packet.
Figure 9B:
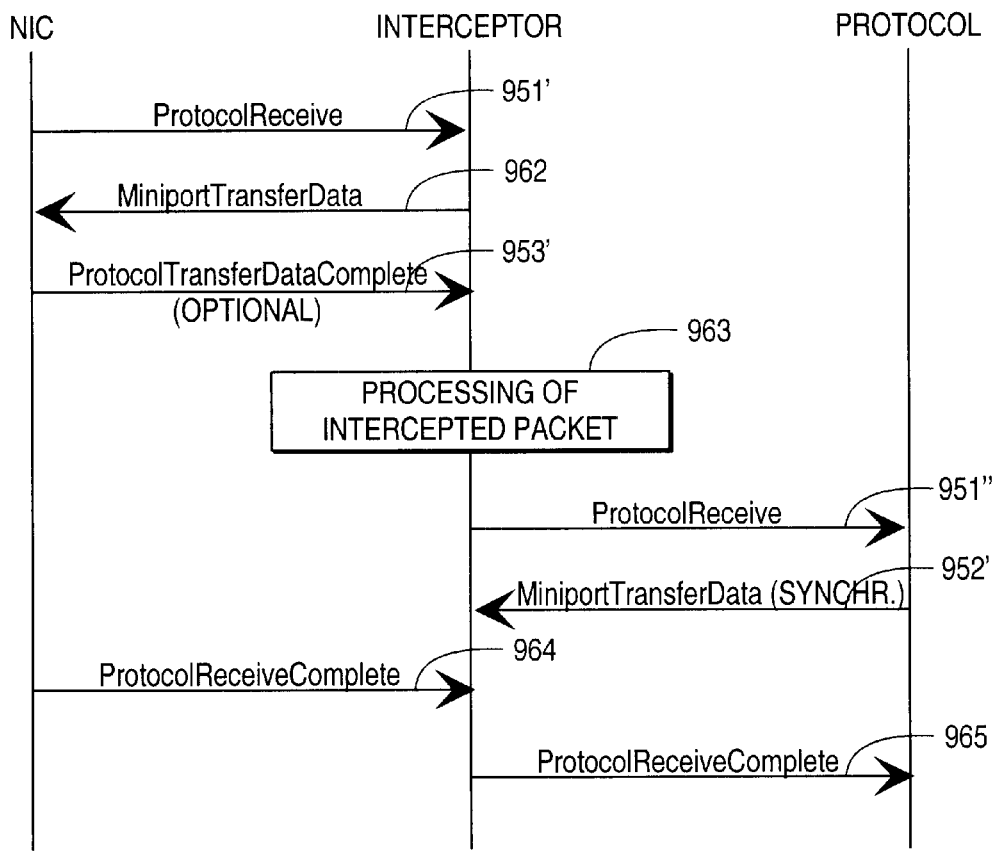
FIG. 9b illustrates a incoming packet handling principle according to an embodiment of the invention, FIG. 9c illustrate a detailed way of handling of an incoming packet according to an embodiment of the invention.

A comparison of FIGS. 9a and 9b illustrate some general differences between prior art and the invention especially in the Windows NT environment. In the prior art arrangement of FIG. 9a the NIC driver sends a ProtocolReceive message 951 to the protocols entity, which answers with a Miniport-TransferData command 952. The operation ends with a ProtocolTransferDataComplete message 953 from the NIC driver. In FIG. 9b which illustrates an aspect of the invention the initial ProtocolReceive message 951' from the NIC driver does not go to the protocols entity but to the packet interceptor module which now answers with the Miniport-TransferData command 962. The ProtocolTransferData-Complete message 953' from the NIC driver is optional, and the actual processing of the intercepted packet takes place in the packet interceptor module at step 963.

In order to pass the processed packet further to the protocols entity the packet interceptor module transmits a new ProtocolReceive message 951" to the protocols entity, which now answers to the packet interceptor module (and not to the NIC driver) with its MiniportTransferData command 952'. A ProtocolReceiveComplete message 964 coming from the NIC driver is forwarded from the packet interceptor module to the protocols entity at step 965.

Figure 9C:
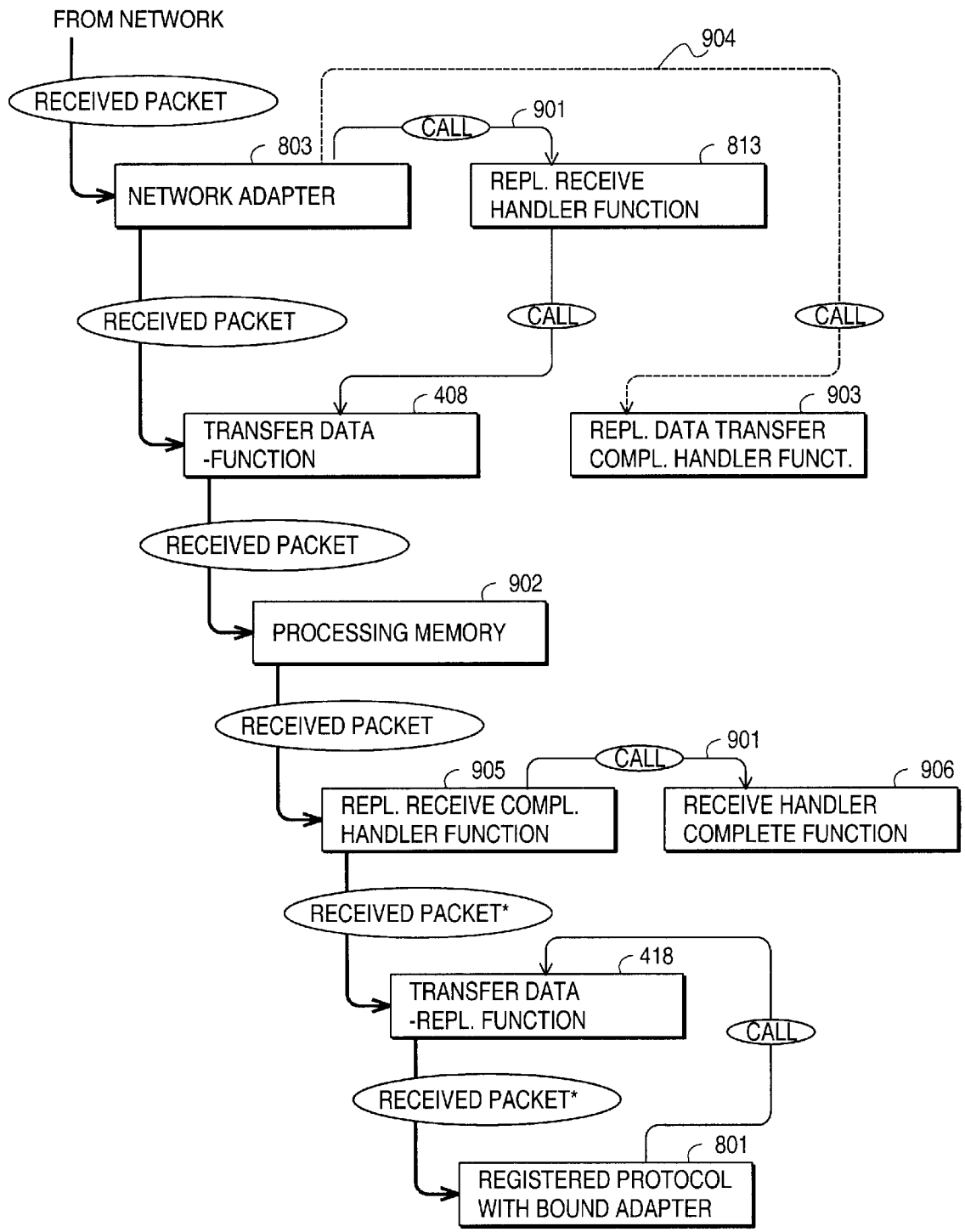

A slightly more detailed view of the handling of an incoming packet is given in FIG. 9c. The interceptor receives incoming packets from network adapters 803 in a call 901 to its replacement receive handler function (in NDIS: ReceiveHandler) 813 as is shown in FIG. 9c. The interceptor transfers data to its memory by calling the original data transferring (in NDIS: NdisTransferData) function 408. If it completes immediately, the packet is added to received packets in processing memory 902. If it does not complete immediately, the data transferring complete handler (in NDIS: TransferDataCompleteHandler) function 903 will be called by the adapter 803 when the transfer is complete according to the dashed arrow 904 in FIG. 9c, and the packet is added to received packets in memory 902 at that time. The received packets can be processed either immediately, or they can be put to queue, and processed asynchronously. The replacement receive complete handler (in NDIS: ReceiveCompleteHandler) function 905 will get called after some packets have been received, and this function is a possible place for the real processing of the queued packets.

The interceptor sends incoming packets to protocols by calling the original receive handler (in NDIS: ReceiveHandler) function 906. The protocol may call the replacement data transferring function (in NDIS: the Ndis-TransferData function) during this call; the replacement will copy data to the protocol. If the replacement always completes immediately, it is possible to free the packet after the receive handler function 906 has returned. After one or more packets have been passed to the receive handler function 906, the original receiving complete handler (in NDIS: ReceiveCompleteHandler) function is called by the replacement ReceiveCompleteHandler function.

In each case, the interceptor uses information that was saved about bindings in the calls to the replacement adapter opening function (in NDIS: NdisOpenAdapter) shown as 415 in FIG. 4 to associate the packets with a particular network adapter and protocol. This can be done e.g. by using the context arguments to the various functions as keys to hash tables.

For Ethernet adapters, the first packets are already normal data traffic. For dial-up adapters, however, the first packets are link control traffic, such as PPP LCP (Point-to-Point Protocol Linc Control Protocol) packets, as described for example in the reference marked as Simpson94 in the enclosed list of references, and IPCP (IP Control Protocol) packets, as described for example in the reference marked as McGregor92. All packets in Windows 95 and Windows 98 look like Ethernet packets. The interceptor can differentiate protocols using the ethertype field contained in the Ethernet header in the packets.

For dial-up links, when the link-level negotiation is complete, the adapter calls the status indication (in NDIS: NdisIndicateStatus) function to tell the protocol that the link is now available. The replacement version, shown as 417 in FIG. 4, is used.

During processing (e.g., in replacement NdisOpenAdapter, in NdisIndicateStatus, or at some other convenient point during operation), the interceptor looks up the protocol address (e.g., IP address) for the adapter from the registry. The address is only available if it is statically configured. If the address is not statically configured, any of a number of methods can be used to determine the dynamic address. These include e.g. analyzing link-layer packets that get passed to the protocol, and extracting the address from the link-layer packet (e.g., PPP IPCP packet, as described for example in the reference marked as McGregor92in the enclosed list of references). Alternatively, the address can be extracted from the first ARP packet sent by the protocol, as described for example in the reference marked as Plummer82. A further alternative is to extract it from a DHCP packet, as described for example in the reference marked as Droms97. In each case, an appropriate field or payload, as documented in the relevant standards, contains the address. External (separate from IP stack) DHCP clients can also dynamically update the registry, writing the newly obtained IP address to the TCP/IP configuration. Thus, the interceptor could also poll the registry for changes in such information.

During processing, the interceptor learns of a new adapter (e.g., dial-up link) becoming available when the replacement status indication function (in NDIS: NdisIndicateStatus) gets called with a corresponding notification, which within NDIS is the known NDIS_STATUS_WAN_LINE_UP notification. Correspondingly, it is notified about the link becoming unavailable by the same function being called with another notification, which in NDIS is the known NDIS_STATUS_WAN_LINE_DOWN notification.

The term binding in the above description is used in the Windows NDIS meaning. A binding is an association between a network adapter and a protocol; each adapter can be bound to zero or more protocols, and zero or more adapters can bind to each protocol. It is also possible to have modules that act as both an adapter and a protocol (intermediate drivers), and thus the binding graph may in reality be quite complicated. In Windows, the bindings are usually automatically configured, but the user may also get to see and modify them. The bindings are handled internally by Windows, and are usually stored in the registry. The corresponding concept exists also in other operating systems, but may be implicit. For example, in FreeBSD all adapters are implicitly bound to all protocols, and the appropriate protocol is determined from the packet type, and the packet is only sent to the protocol that knows how to process it.

Registry in the above description means the Windows registry, or its older alternative, INI files. In general, it is just a storage for information. The Windows registry allows at least limited tree structure, and name-value assignments. Windows configuration files (INI files) have a similar, but more limited structure. Other known forms of information storage can be used instead of such registry, or even such forms which are not known to the person skilled in the art at the time of filing this patent application but having became available, are obviously suited for similar kind of information storage.

Figure 10:
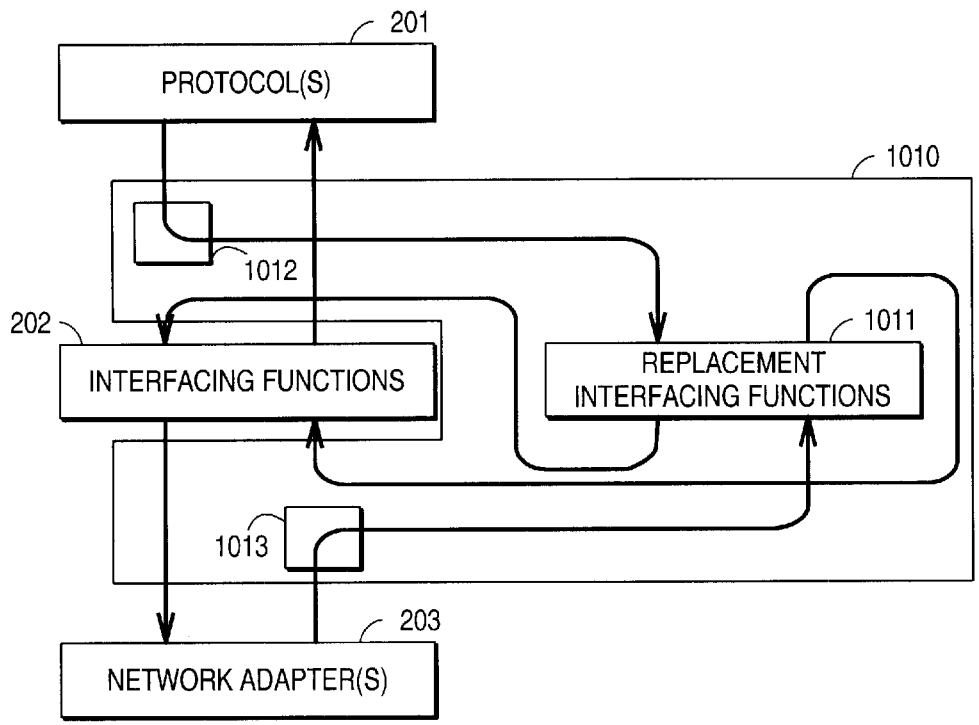
FIG. 10 shows the principle of a second embodiment of the invention.

The embodiment of the invention above was just one example. Another possible embodiment of the invention is the implementation of a dynamically loadable interceptor module for IPSEC, firewall, and other applications on the FreeBSD operating system. A similar approach works e.g. for Linux and NetBSD. Such a loadable kernel module interceptor follows the operational principle shown in FIG. 10. The packet interceptor module 1010 comprises a set of replacement functions 1011 as well as upper hooking means 1012 and lower hooking means 1013, but the arrangement is asymmetric between transmission directions. In the transmit direction the hooking takes place through the upper hooking means 1012 between the protocols block 201 and the original interfacing functions block 202. In the receive direction the hooking takes place through the lower hooking means 1012 between the network adapters block 203 and the original interfacing functions block 202. In both directions the packets that have gone through the interceptor are "returned" to the hooking point in the sense that the original interfacing function(s) are used to take the packets further to their destination.

The packet interceptor module according to this second embodiment of the invention is most advantageously a dynamically loadable kernel module. It is loaded into kernel memory like any other driver at some step before it is taken into use. The loading step is shown as step 1101 in FIG. 11.

When started at step 1102, the module momentarily disables interrupts and modifies the binary code of the operating system kernel at step 1103 so that certain functions are redirected to replacement functions contained in the module. For example, in FreeBSD the functions to be replaced could include the ip_input, ip_output and ifioctl functions. Of these, ip_input normally receives packets from the network, ip_output is called to send them to the network and ifioctl is called e.g. when network interface status changes. The original functions are saved so that they can be called from the replacement functions. Ways of doing this are described below. After the functions have been replaced, interrupts can again be enabled at step 1104. It may also be necessary to flush the instruction cache, depending on the cpu architecture, if code was modified.

Figure 11:
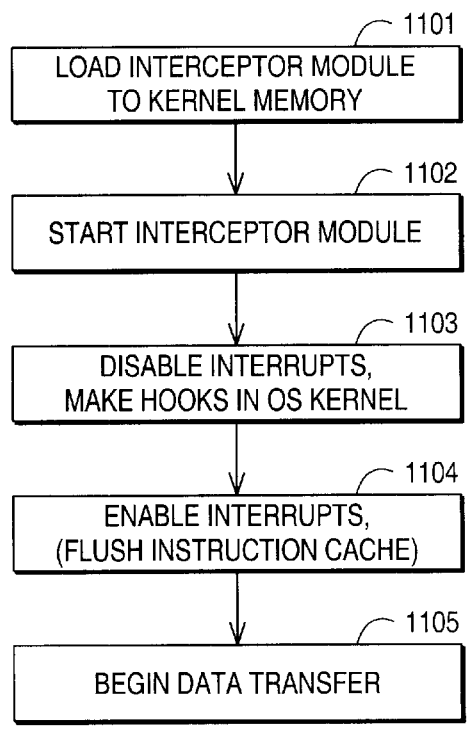
FIG. 11 illustrates in general the steps required to apply the second embodiment of the invention.

After the steps 1101 to 1104 of FIG. 11 data transfer will take place in accordance with step 1105 using the replacement functions which were loaded at step 1101 and provided with hooks at step 1103.

Figures 12A, 12B:
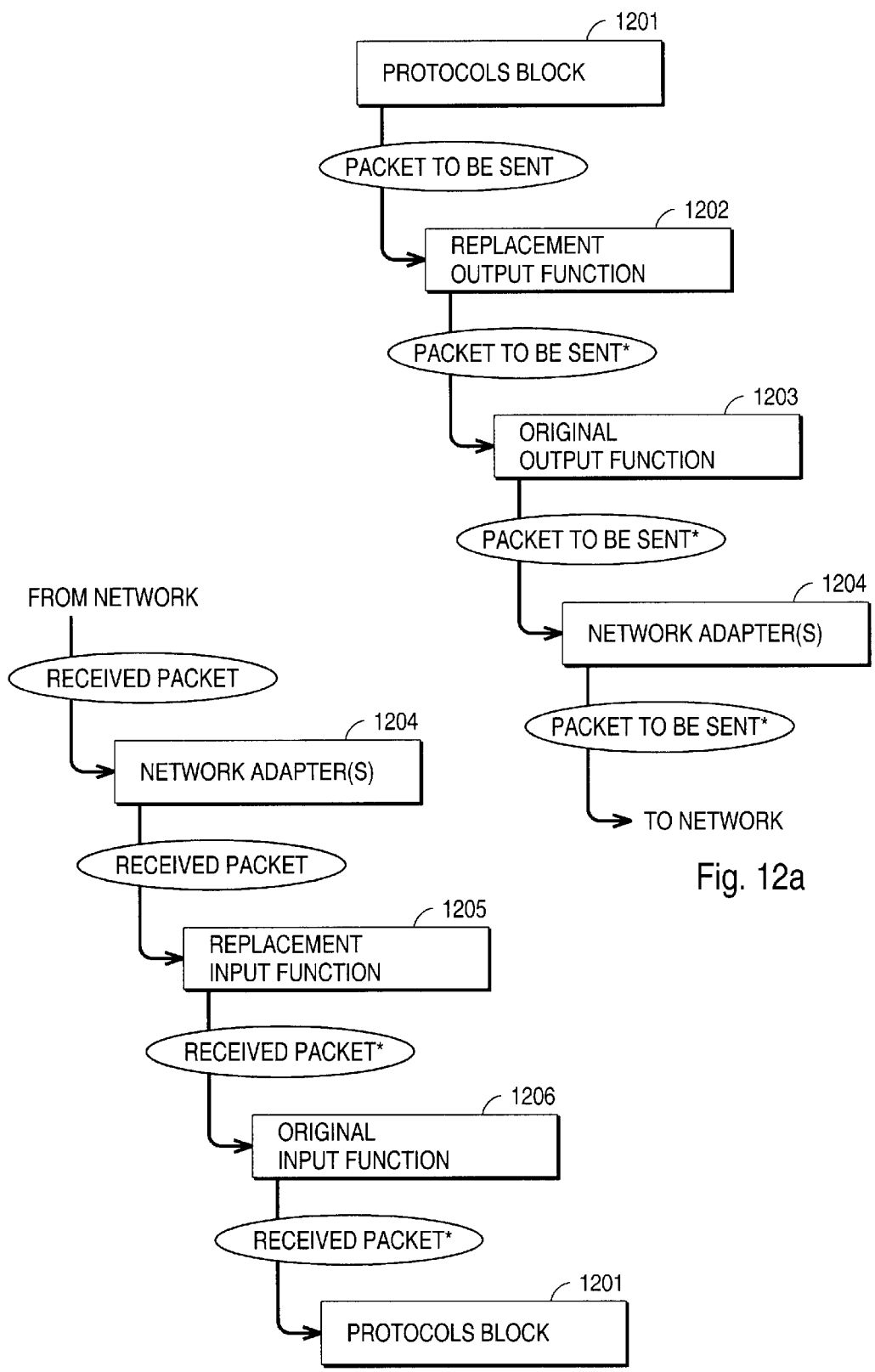
FIGS. 12a and 12b illustrate the use of the second embodiment of the invention.

FIGS. 12a and 12b show how packets are transmitted and received using the second embodiment of the invention. To receive outgoing packets from protocols 1201, the replacement output function (in FreeBSD: the ip_output function) 1202 within the packet interceptor gets called. To send outgoing packets to adapters 1204, the interceptor calls the original output (ip_output) function 1203.

To receive incoming packets from the adapters 1204, the replacement input (ip_input) function 1205 within the packet interceptor gets called. To send incoming packets to protocols 1201, the interceptor calls the original input (ip_input) function 1206.

In the second embodiment of the invention the interceptor gets information about active network interfaces by looking at the ifnet global variable or, in other similarly acting operating system, a corresponding other variable in the kernel. This variable contains a list of network interfaces, and each interface data structure contains the protocol addresses of the interface.

Further in the second embodiment of the invention the interceptor learns about new network interfaces (e.g. dial-up lines going up or down) when the replacement ifioctl function gets called. After calling the original ifioctl function the interceptor can then reread the list of network interfaces, and learn of any changes that way.

Figure 13:
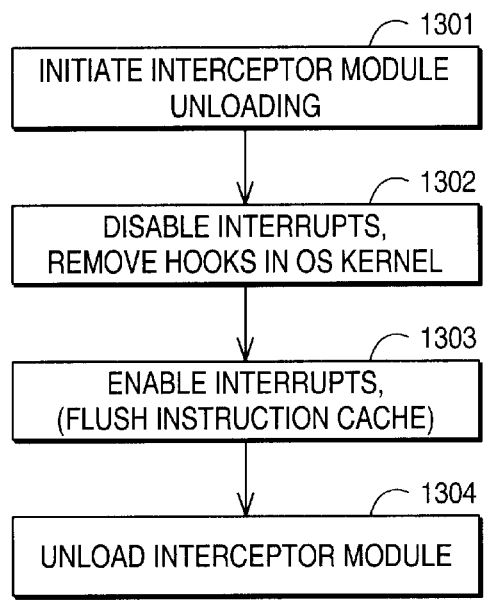
FIG. 13 illustrates the unloading of a module according to the second embodiment of the invention and FIG. 14 illustrates a hardware arrangement in accordance with the invention.

If the unloading of the kernel module according to the second embodiment of the invention is initiated as at step 1301 of FIG. 13, it is most advantageous to disable interrupts and restore the functions to their originals as at step 1302, re-enable interrupts and possibly flush instruction cache as at step 1303, and continue with the unload as at step 1304 by re-emptying the memory locations previously allocated to the packet interceptor.

In some applications, the interceptor may be interested in finding only specific adapters or protocols out of all adapters or protocols installed in the system. Thus, the interceptor may not want to determine information about all adapters. Instead, it may stop looking at such information e.g. after it has found all the network adapters it was looking for.

In several places in the above description reference was made to hooking or replacing a function. In the appended claims the term hooking will be used collectively for such operations. There are many ways of implementing hooking. Many of these ways have been known for a relatively long time, but have not been used in combination with packet interception. A common explanation of the concept "hooking" is that it means replacing a certain original function in a program (e.g., in the operating system kernel) so that a different function, often known as the replacement function, gets called instead of the original function. Any of the ways described herein of redirecting a call to a function to another replacement function which may or may not call the original function as part of its processing is to be understood as within the meaning of the term "hooking" as it is used in the claims. Hooks are often provided as an extension mechanism. Hooks can have any one of several semantics: the replacement function may be called instead of the original function, before the original function, or after the original function.

The implementation of the actual hooking procedure also varies. In some cases, the possibility of hooking may have been designed in. In such cases, there is typically a list of functions that will be called, and new functions can be added to the list (often called a list of hooks or hook functions). In other cases, a function may be called through a function pointer, even though the function pointer was not designed to be hooked. In such cases, hooking can be implemented by changing the function pointer to point to the replacement function. The replacement function can then, at its option, call the original function at any point. A similar situation may exist implicitly; for example, some implementations of dynamically linked libraries have a table or association list of entry points that can be modified to achieve the same effect (such a table is also called a dispatch table). Some systems also provide a mechanism for retrieving and modifying hardware or software interrupt vectors, which can be seen as a possible mechanism for hooking. All such processing is to be understood as within the meaning of the term "hooking" as it is used in the claims.

Sometimes there is no mechanism available for redirecting calls to a function. In these cases, it is possible to implement hooking by modifying the binary-format program code on the fly. One possible implementation of such hooking is to save a few bytes from the beginning of the original function, and replace them by a jump instruction to the replacement function. One way of calling the original function in such a case is to analyze the first saved instructions of the original function, and after the first instruction that was not overwritten by the jump instruction written to the original function, insert a jump to the corresponding location in the original function. With small variations on how the code that the jump in the original code points to, the replacement function can be called instead of, before, or after the original. All such processing is to be understood as within the meaning of the term "hooking" as it is used in the claims.

The replacement function is sometimes called the hook version of the function, as opposed to the original function. This function is especially used if the replacement function is called instead of the original function (which, of course, does not exclude the possibility that it might make an explicit call to the original code from somewhere within its execution).

As a clarification, using normal APIs (Application Programming Interfaces) and other interfaces would typically not be considered hooking, even if function pointers or callbacks were passed along in the API. For example, a typical intermediate driver or STREAMS module does not do hooking, but instead uses the documented (or reverse-engineered) interfaces for network adapters and protocols, and acts as a protocol in one direction and as an adapter in the other direction.

A method very similar to the invention above can be used in some environments instead of hooking. The kernel of many operating systems, such as Windows NT, consists of several dynamically loadable libraries (DLLs) or modules. Each module provides a well-defined programming interface to the rest of the kernel, and implements the interface using some internal method. The network protocol framework in Windows NT is implemented by the NDIS.SYS file. This file implements the function calls that are used by network adapter drivers and network protocols.

Windows NT does not provide a convenient interface for hooking DLL entry points like the one available for Windows 95 and 98 VxDs. It would be possible to hook the NDIS functions by replacing code from the beginning of the original functions; however, this is rather complicated. An alternative but conceptually similar approach is described here.

Basically, one can achieve functionality similar to hooking by moving aside (saving) the original operating system module (NDIS.SYS), replacing it by a new module that implements the same programming interface, performs interceptions, and calls the original operating system module whenever it wishes to perform the original operation.

There are, however, three problems with this simple approach. The programming interface (API) provided by the kernel module (NDIS.SYS) can change between each version of the operating system (even between different OEM versions or service packs). Thus, simply replacing the module will lead to serious compatibility problems (quite likely, the computer would not boot if the replacement module was used with an incompatible service pack). The second problem is related; when an upgrade or service pack is installed, a complaint may be given to the user about the file having changed. This confuses users and may break the installation of service packs. The third problem is related: if a new service pack has been installed, and it has replaced the old operating system module by a new one, the interceptor may no longer get loaded.

One possible solution to this problem is to have a separate program run after each reboot, and have that program check if the module has changed, and if so, replace it with the interceptor module.

A second solution is to create what is called a native application: an application that runs before the operating system loads the networking modules. A native application runs over the NT kernel but without Win32 or other user mode subsystems. A native application is thus a user mode application running over NT, but not really a "Windows" application. Such applications are traditionally used e.g. for boot-time cleanups, such as file system consistency and integrity checks. A method that solves all three problems above works as follows:

At boot, run a native program. This program first checks if the kernel module (e.g. NDIS.SYS) is already a replacement generated by itself If so, it removes the replacement and restores the original. Then, it begins its real work. It moves the original aside, reads its entry point table, reads the entry point table of the interceptor module, and dynamically creates a new module that contains the same entry points as the original module, and forwards each entry point to the interceptor module if that entry point exists in the interceptor module, and to the original module if the entry point does not exist in the interceptor module. The generated module is written in the place of the original module.

Boot then continues, and the generated module is loaded. The original module and the interceptor module are also loaded.

When the operating system has been loaded, a program (e.g., system service application) is run that removes the generated DLL and instead moves the original operating system module (NDIS.SYS) back.

This method provides a high level of robustness against differences between service packs, as it is quite rare that interfaces would change in completely incompatible ways (as opposed to adding new interfaces). It also avoids the problems in installing service packs, as the original kernel module will always be there when a service pack is installed, and the new module will get used after the service pack has been installed.

It should be noted that the above procedure could be implemented in multiple ways. The operations can be performed in different orders, other interleaving operations may be added, and some of the operations left out without substantially affecting the ideas behind the procedure.

Contrary to some previous approaches, the method of this invention places very few limitations on the application using the interceptor. The application may pass all data packets through the interceptor, may queue them, may drop them, may modify them, and may also inject entirely new packets to the packet stream seen by adapters and protocols.

While the invention was described above in the context of Windows 95, Windows 98, Windows NT, Solaris and FreeBSD operating systems, it is directly applicable to a number of other operating systems, such as Windows 2000, NetBSD, and Linux. The details of the method depend intimately on the intricacies of the underlying system, and it is possible to quite freely reorder the operations. It should also be understood that while the invention has been described in the context of a single kernel driver, it is possible to split some of the functionality to separate kernel drivers or even a user-mode application. In some operating systems there may not even be any distinction between kernel and user-mode operations.

Figure 14:
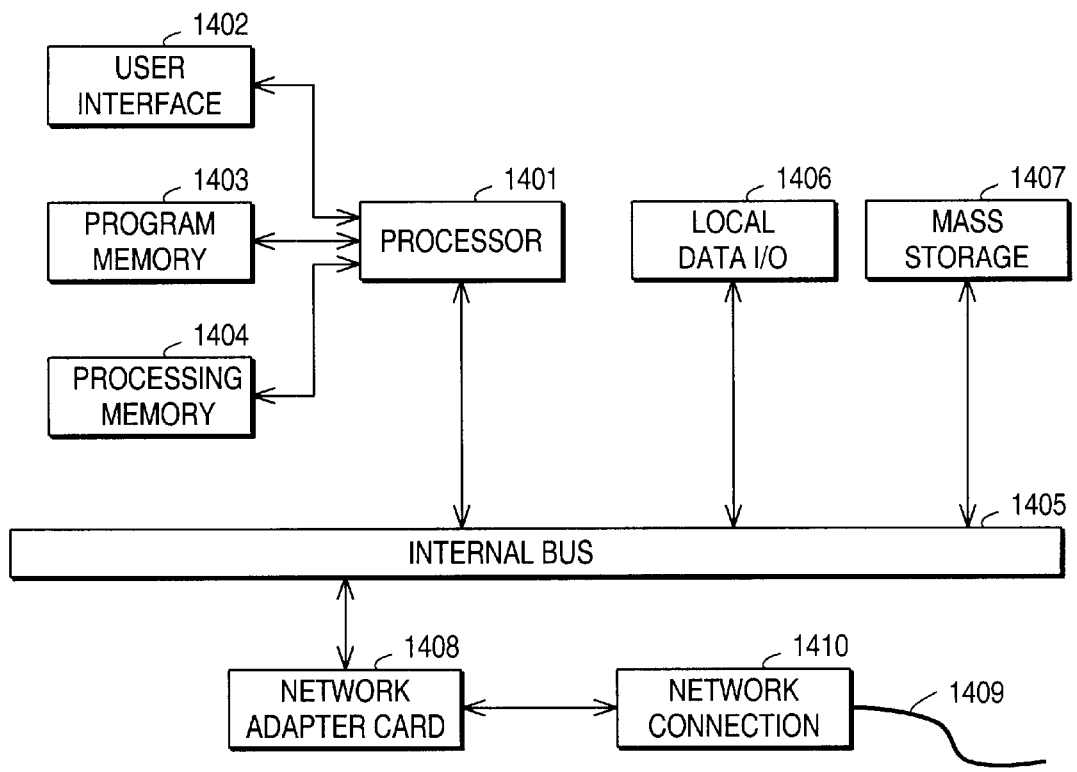

FIG. 14 illustrates a hardware arrangement which can be used to implement the present invention. The computer apparatus of FIG. 14 is built around a processor 1401 which is coupled to a user interface (preferably a keyboard and display interface) 1402 for receiving user instructions and displaying information to the user, a program memory 1403 for storing the operating system kernel and other programs during operation, and a processing memory 1404 to be used as a run-time temporary storing place of information, e.g. packets that are in the middle of the process of being transmitted or received. The processor is further coupled to an internal bus 1405 for exchanging information with other parts of the computer, such as a local data input/output device (preferably a CD-ROM station) 1406, a mass storage (preferably a hard disk) 1407 and a network interface card 1408. The latter is coupled to the physical transmission medium 1409 of a packet-switched data transmission network through a network connection 1410.

For the purposes of the invention the computer arrangement of FIG. 14 must firstly be able to receive and load the program code that consists of processor-executable instructions and implements the hookings and replacement functions that constitute the packet interceptor module. This requirement is easily fulfilled, because the packet interceptor module according to the invention is most preferably distiributed in a stored form either on a portable storage medium that is readable by the local data input/output device 1406, or as a file that is accessible through the network to which the computer arrangement is coupled through the network interface card 1408 and network connection 1410. Only common loading commands of a known kind issued by the user through the user interface 1402 are required to initiate the loading of such program code from the local data input/output device 1406 or the network connection 1410 to the program memory 1403. It is also recommendable that the program code is stored into the mass storage 1407 so that it can be easily reloaded at startup or when otherwise necessary.

Secondly the computer arrangement of FIG. 14 must be able to execute the program code loaded into the program memory 1403 that implements the hookings and replacement functions that constitute the packet interceptor module. This is also easily accomplished as long as the program code is compatible with the operating system that controls the operation of the computer arrangement. In the previous parts of this patent application we have explicitly shown how certain functions and hooking procedures are used together with certain explicitly recited and known operating systems. However, it is obvious to the person skilled in the art that once the principles of the invention taught in this patent application have been read and understood, it is possible to generalize the invention to use with an arbitrary operating system (either known at the filing date of this patent application or to be developed in the future) by using the hooking mechanisms available in that operating system and replacing the respective functions that are related to the handling of incoming and outgoing packets.

LIST OF REFERENCES

AT93
  P. Adams, C. Tondo: Writing Unix Device Drivers in C, Prentice Hall, 1993.
Baker97
  A. Baker: The Windows NT Device Driver Book, Prentice Hall, 1997.
Bonner96
  P. Bonner: Programming with Windows Sockets, Prentice Hall, 1996.
Brain96
  M. Brain: Win32 System Services, Prentice Hall, 1996.
CB94
  W. Cheswick, S. Bellovin: Firewalls and Internet Security, Addison-Wesley, 1994.
CZ95
  B. Chapman, E. Zwicky: Building Internet Firewalls, O'Reilly, 1995.

DEJANEWS

Public discussions in the comp.os.ms-windows.programmer.nt.kernel-mode and comp.os.ms-windows.programmer.win95.vxd newsgroups, 1997–1999 (archived e.g. at www.dejanews.com).
Dhawan95
  S. Dhawan: Networking Device Drivers, Van Nostrand Reinhold, 1995.
Droms97
  R. Droms: Dynamic Host Configuration Protocol, RFC 2131, Internet Engineering Task Force, 1997.
ES90
  M. Ellis, B. Stroustrup: The Annotated C++ Reference Manual, Addison-Wesley, 1990.
Ezzell97
  B. Ezzell: NT 4/Windows 95 Developer's Handbook, SYBEX, 1997.
KA98
  S. Kent, R. Atkinson: Security Architecture for the Internet Protocol, RFC 2401, Internet Engineering Task Force, 1998.
Kauler97
  B. Kauler: Windows Assembly Language and Systems Programming, R&D Books, 1997.
Lanciani92DIS_PKT
  D. Lanciani: DIS_PKT.ASM file, 1992. Available at www.danlan.com.
Lanciani94IBANPKT
  D. Lanciani: IBANPKT program, 1994. Available at www.danlan.com.
Lanciani96OdiPKT3.1
  D. Lanciani: ODIPKT 3.1 program, 1996. Available at www.danlan.com.
Lanciani97NFSTDI
  D. Lanciani: NFSTDI program, 1997. Available at www-.danlan.com.
Lanciani97NDIS3PKT
  D. Lanciani: NDIS3PKT program, 1997. Available at www.danlan.com.
Lanciani98
  Dan Lanciani: Re: Intercepting Packets at NDIS Level, article posted to comp.os.ms-windows.programmer.nt.kernel-mode, Feb. 18, 1998 (archived e.g. at www.dejanews.com).

Lanciani98PPPMAC
Dan Lanciani: Re: Help about PPPMAC, article posted to comp.os.ms-windows.programmer.nt.kernel-mode, Dec. 17, 1998 (archived e.g. at www.dejanews.com).

Lanciani98Reply
Dan Lanciani: Re: Interceptor packets at NDIS level, article posted to comp.os.ms-windows.programmer.nt.kernel-mode, Mar. 1, 1998 (archived e.g. at www.dejanews.com).

McGregor92
G. McGregor: The PPP Internet Protocol Control Protocol (IPCP), RFC 1332, Internet Engineering Task Force, 1992.

MSDOS5
MSDOS 5.x programmer's manual, Microsoft, 1986(?).

Nogar97
R. Nogar: Windows NT File System Internals, O'Reilly, 1997.

PCAUSA99
Implementing a intermediate driver that works with RAS under NT, Web Page http://www.pcausa.com/resources/im-ras.html, March 1999.

Pentium
Pentium Processor Family User's Manual, Vol. 3, Intel, 1994.

Perkins96
C. Perkins: IP Mobility Support, RFC 2290, Internet Engineering Task Force, 1996.

Petzold92
C. Petzold: Programming Windows 3.1, Microsoft Press, 1992.

Plummer82
D. Plummer: Ethernet Address Resolution Protocol, RFC 826, Internet Engineering Task Force, 1982.

Postel81
J. Postel: Internet Protocol, RFC 791, Internet Engineering Task Force, 1981.

QS96
B. Quinn, D. Shute: Windows Sockets Programming, Addison-Wesley, 1996.

SCFJ96
H. Schulzrinne, S. Casner, R. Frederick, V. Jacobson: RTP: ATransport Protocol for Real-Time Applications, RFC 1889, Internet Engineering Task Force, 1996.

Simpson94
W. Simpson: The Point-to-Point Protocol (PPP), RFC 1661, Internet Engineering Task Force, 1994.

Sinha96
A. Sinha: Network Programming in Windows NT, Addison-Wesley, 1996.

Steele90
G. Steele: Common Lisp- The Language, 2nd ed., 1990.

STREAMS93
SunOS 5.2 STREAMS Programmer's Guide, Sun Microsystems, 1993.

SWE98
C. Scott, P. Wolfe, M. Erwin: Virtual Private Networks, O'Reilly, 1998.

VM99
P. Viscarola, W. Mason: Windows NT Device Driver Development, OSR Open Systems Resources Inc, 1999.

Waldbusser97
S. Waldbusser: Remote Network Monitoring Management Information Base, RFC 2021, Internet Engineering Task Force, 1997.

Win4DDK
Microsoft Windows NT 4.0 Device Driver Kit, Microsoft, 1996.

Win95DDK
Microsoft Windows NT 95 Device Driver Kit, Microsoft, 1996.

Win98DDK
Microsoft Windows NT 98 Device Driver Kit, Microsoft, 1998.

WS95
G. Wright, W. Stevens: TCP/IP Illustrated, Vol. 2, Addison-Wesley, 1995.

What is claimed is:

1. A method for intercepting and processing network packets in a computer system, where network packets are communicated between a first network adapter and a first protocols entity, of which said first network adapter implements a first network interface, the method comprising the steps of providing a set of three or more replacement functions within a packet interceptor software component, said replacement functions capable of processing said network packets in a desired way or receiving status information about a network interface;

hooking at least a first original function used for transmitting network packets from said first protocols entity to said first network adapter into a first replacement function;

hooking at least a second original function used for transmitting network packets from said first network adapter to said first protocols entity into a second replacement function; and hooking at least a third original function used for receiving information about the status of the network interface implemented by said first network adapter into a third replacement function;

and wherein hooking is defined as redirecting function calls to all said original functions to corresponding replacement functions so that said replacement functions are invoked by said redirected function calls.

2. A method according to claim 1, additionally comprising the steps of determining, whether or not a dynamic IP address has been allocated for the network interface implemented by said first network adapter; and in a case where a dynamic IP address has been allocated for the network interface implemented by said first network adapter, determining what said dynamic IP address is;

and wherein each said hooking step is further defined as accomplishing said redirection by altering at least some pointers or addresses in a function call table of an application programmatic interface that point to at least some of said original functions so as to point to corresponding replacement functions.

3. A method according to claim 1, additionally comprising a step of identifying a first network adapter and a first protocols entity installed in the computer system, so arranged that this step comprises first the substep of hooking a registration function and used by network adapters and protocols entities to register themselves to the computer system, into a certain replacement registration function;

and after that without any specific order the substeps of
identifying said first network adapter when it uses said replacement registration function to register itself to the computer system and identifying said first protocols entity when it uses said replacement function to register itself to the computer system, and wherein hooking is further defined as processing a network packet when said replacement function is invoked by a redirected function call, and, after said processing is completed, returning said network packet to said original function whose function call was redirected for further processing.

4. A method according to claim 3, wherein the step of hooking said registration function used by network adapters and protocols entities to register themselves comprises, without any specific order, the substeps of loading an interface module that determines said registration function;

loading a packet interceptor module that determines said replacement registration function; and performing said hooking by redirecting predetermined function calls made to said registration function to predetermined function calls of said replacement registration mechanism.

5. A method according to claim 4, wherein the step of loading an interface module that determines said registration function comprises the step of loading an NDIS interface module, and the step of redirecting function calls to said registration function to predetermined function calls of said replacement registration mechanism comprises the substeps of hooking the NdisRegisterProtocol function determined by said NDIS interface module into a replacement protocol registering function determined by said packet interceptor module; and hooking the NdisOpenAdapter function determined by said NDIS interface module into a replacement network adapter opening function determined by said packet interceptor module.

6. A method according to claim 5, wherein the step of hooking the NdisRegisterProtocol function comprises the step of replacing a plurality of the functions in the NDIS_PROTOCOL_CHARACTERISTICS structure determined by said NDIS interface module.

7. A method according to claim 6, wherein the step of replacing a plurality of the functions in the NDIS_PROTOCOL_CHARACTERISTICS structure comprises the step of replacing the ReceiveHandler, ReceiveCompleteHandler and TransferDataCompleteHandler functions determined by said NDIS interface module.

8. A method according to claim 7, wherein the step of replacing a plurality of the functions in the NDIS_PROTOCOL_CHARACTERISTICS structure comprises additionally the step of replacing the SendCompleteHandler and RequestCompleteHandler functions determined by said NDIS interface module.

9. A method according to claim 5, additionally comprising the step of determining, which bindings connect said first network adapter and said first protocols entity, by calling said replacement adapter opening function.

10. A method according to claim 1, additionally comprising the steps of loading said first network adapter and said first protocols entity and determining, which bindings connect said first network adapter and said first protocols entity, by analyzing data structures after said first network adapter and said first protocols entity have been loaded.

11. A method according to claim 10, wherein said step of analyzing data structures after said first network adapter and said first protocols entity have been loaded comprises the step of reading a piece of system configuration information from a memory.

12. A method according to claim 11, wherein said step of reading a piece of system configuration information comprises the step of reading a registry.

13. A method according to claim 1, additionally comprising the step of identifying the first network adapter and the first protocols entity, so that this step comprises the substep of reading a piece of system configuration information from a memory.

14. A method according to claim 13, wherein the substep of reading a piece of system configuration information from a memory comprises the reading of a registry.

15. A method according to claim 1, additionally comprising the steps of loading said first network adapter and said first protocols entity and identifying the first network adapter and the first protocols entity by traversing data structures after adapters and protocols have been loaded into the computer system.

16. A method according to claim 15, comprising first without any specific order the steps of loading said first protocols entity into the computer system; and loading said first network adapter into the computer system;

and after that, in the following order, the steps of loading a dynamically loadable packet interceptor module into the computer system; and traversing data structures to identify said first network adapter and said first protocols entity.

17. A method according to claim 1, wherein at least one of said hooking steps comprises the substeps of locating the beginning of the executable program code of a certain first function that is to be hooked into a certain first replacement function;

saving a copy of a certain passage of executable program code starting from said beginning; and replacing said certain passage of executable program code starting from said beginning with another passage of executable program code that transfers execution to said first replacement function.

18. A method according to claim 1, wherein at least one of said hooking steps comprises the substeps of locating, in a data structure, a function pointer that points to a certain first function that is to be hooked into a certain first replacement function;

saving a copy of said function pointer; and replacing said function pointer with another function pointer that points to said first replacement function.

19. A method according to claim 1, wherein at least one of said hooking steps comprises the substeps of locating a dispatch table in a dynamically loaded module; and modifying said dispatch table.

20. A method according to claim 1, wherein at least one of said hooking steps comprises the substep of calling a system function that installs a hook for a system service.

21. A method according to claim 1, wherein at least one of said hooking steps comprises the substep of adding a first replacement function into which a certain first function is hooked to a system-provided hook list.

22. A method according to claim 1, wherein at least one of said hooking steps comprises the substep of redirecting an interrupt vector that vectors processing to a function so as to redirect processing to a replacement function.

23. A method according to claim 1, wherein each hooking step comprises handling a network packet or doing any other processing such as receiving status information about a network interface using a replacement function and doing so without passing said network packet to back to said original function which is hooked into said replacement function thereby completely bypassing said original function.

24. A method according to claim 1, additionally comprising the step of calling a certain first function from a certain first replacement function into which said first function is hooked.

25. A method according to claim 1, additionally comprising, in the following order, the steps of
modifying a network packet with said first replacement function and
passing the modified network packet to said function which is hooked into said first replacement function.

26. A method according to claim 1, additionally comprising the step of copying a network packet by applying a replacement function.

27. A method according to claim 1, additionally comprising the step of calling a certain first function, which is hooked into a certain first replacement function, without first calling said first replacement function.

28. A method according to claim 1, additionally comprising the steps of
determining whether a dial-up link is up or down; and
providing information about said dial-up link being up or down to said packet interceptor module.

29. A method according to claim 1, additionally comprising the steps of
determining at least one network address used for said first network interface; and
providing information about determined network addresses to said packet interceptor module.

30. A method according to claim 29, wherein the step of determining at least one network address comprises the substep of examining link-layer protocol packets.

31. A method according to claim 30, wherein the step of examining link-layer protocol packets comprises the substep of examining IPCP packets where IPCP is a subprotocol of PPP.

32. A method according to claim 30, wherein the step of examining link-layer protocol packets comprises the substep of examining ARP protocol packets.

33. A method according to claim 29, wherein the step of determining at least one network address comprises the substep of examining the DHCP protocol.

34. A method according to claim 29, wherein the step of determining at least one network address comprises the substeps of
hooking a function that is to be called when there is a change in the address information into a replacement function;
traversing a number of predetermined data structures at the time of calling said replacement function; and
comparing information read from said traversed data structures against a predetermined piece of earlier saved corresponding information.

35. A method according to claim 1, further comprising the step of
modifying information passed between said first network adapter and said first protocols entity about link-layer characteristics; and
as a result of said modification of information, reducing the maximum transmitted packet size known to said first protocols entity on a link.

36. A method for intercepting network packets in a computer system, where a plurality of original functions are used to communicate network packets between a plurality of network adapters and a plurality of protocols entities, of which the network adapters implement certain network interfaces, the method comprising the steps of
providing a set of replacement functions within a packet interceptor module;
hooking a plurality of original functions used for transmitting network packets from protocols entities to network adapters into a first set of replacement functions, said hooking occurring at a programmatic interface of said original functions, and wherein said original functions are incapable of performing at least some of said functions of said replacement function and are incapable of being modified to reliably perform said at least some of said functions performed by said replacement function;
hooking a plurality of original functions used for transmitting network packets from network adapters to protocols entities into a second set of replacement functions, said hooking occurring at a programmatic interface of said original functions, and wherein said original functions are incapable of performing at least some of said functions of said replacement function and are incapable of being modified to reliably perform said at least some of said functions performed by said replacement function; and
hooking a plurality of original functions used for receiving information about the status of the network interfaces implemented by network adapters into a third set of replacement functions, said hooking occurring at a programmatic interface of said original functions, and wherein said original functions are incapable of performing at least some of said functions of said replacement function and are incapable of being modified to reliably perform said at least some of said functions performed by said replacement function; and
wherein hooking, as the term is used herein, means redirection in any way of function calls to said original functions to cause each said redirected function call to be redirected so as to call a corresponding replacement function.

37. A method according to claim 36, additionally comprising the step of identifying a number of network adapters and protocols entities which are installed in the computer system.

38. A method according to claim 37, wherein the step of identifying a number of network adapters and protocols entities comprises the substep of ignoring one or more member of the group of said network adapters and protocols.

39. A method for intercepting network packets in a computer system, where a certain first operating system module is used to implement network functionality using a plurality of original functions and said first operating system module implements a certain programming interface with a plurality of entry points by which said original functions in said operating system module can be invoked by making a function call to said entry point, but wherein said first operating system module is not capable of performing one or more desired functions and is not capable of being modified to reliably perform said one or more desired functions, the method comprising the steps of without removing said first operating system module, functionally replacing said first operating system module with a first replacement module that has replacment functions therein which can be called to perform said one or more desired functions said first replacement module implementing a programming interface equal to said programming interface of said first operating system module and which receives at least some function calls to said first operating system module to invoke one or more original functions and cause one or more corresponding replacement functions to be invoked instead, said functionally replacing without removing step comprising the substeps:

moving said first operating system module aside, reading the entry point table of said first operating system module, reading the entry point table of said first replacement module, dynamically creating a new software module that contains the same entry points as said first operating system module originally had, forwarding each function call to an entry point of said first operating system module to a corresponding entry point of said first replacement module if there is one but forwarding each function call to an entry point of said first operating system module to the new entry point of said first operating system module if there is no corresponding entry point of said first replacement module;

using said replacement module to identify at least a first network adapter and at least a first protocols entity installed in the computer system;

using said replacement module to replace without removing at least one original function used for transmitting network packets from said first protocols entity to said first network adapter;

using said replacement module to replace without removing at least one original function used for transmitting network packets from said first network adapter to said first protocols entity;

using said replacement module to replace without removing at least one original function used for receiving information about the status of a network interface implemented by said first network adapter;

using said replacement module to determine, whether or not a dynamic Internet Protocol (P) address has been allocated for said network interface implemented by said first network adapter; and in a case where a dynamic IP address has been allocated for said network interface implemented by said first network adapter, using said replacement module to determine, what said dynamic IP address is.

40. A method according to claim 39, additionally comprising the step of calling said first operating system module from said replacement module, such that at least some of said replacement functions in said first replacement module return each network packet processed by said replacement function to said original function in said first operating system module such that said original function in said first operating system module can process said packet further.

41. A method according to claim 39, wherein the step of replacing said first operating system module with said replacement module comprises the substeps of moving said first operating system module aside at installation time when an operating system is booting and replacing said first operating system module with said first replacement module until said operating system has completed booting, and then removing said first replacement module and said new software module and moving said first operating system module back to its original position in memory.

42. A method according to claim 39, wherein said step of replacing said first operating system module with said replacement module is performed when the computer system boots but before said first operating system module is loaded.

43. A method according to claim 42, additionally comprising the step of undoing the replacing by said replacement module after said first operating system module has been loaded.

44. A method according to claim 39, additionally comprising the step of automatically generating said replacement module based on the said first operating system module.

45. A computer system for handling network packets, comprising a first network adapter arranged to implement a network interface;

a first protocols entity;

a number of predetermined functions for communicating network packets between said network adapter and said protocols entity;

a packet interceptor module for implementing a set of replacement functions;

within said packet interceptor module, means for hooking at least one function used for transmitting network packets from said first protocols entity to said first network adapter into a first replacement function such that each function call to an original function used for transmitting a network packet from a protocols entity to a network adapter is redirected to an appropriate replacement function which processes said network packet in a desired way;

within said packet interceptor module, means for hooking at least one function used for transmitting network packets from said first network adapter to said first protocols entity into a second replacement function such that each function call to a function used for transmitting a network packet from a network adapter to a protocols entity is redirected to an appropriate replacement function which processes said network packet in a desired way; and within said packet interceptor module, means for hooking at least one function used for receiving information about the status of the network interface implemented by said first network adapter into a third replacement function such that each function call to a function used for receiving status of a network adapter is redirected to an appropriate replacement function.

46. A computer system according to claim 45, additionally comprising means for identifying said first network adapter and said first protocols entity.

47. A packet interceptor module for intercepting network packets in a computer system which comprises a first network adapter, a first protocols entity and a number of predetermined functions having a programmatic interface, said functions for communicating network packets between said network adapter and said protocols entity, said packet interceptor module comprising the definition of a set of replacement functions;

means for hooking at least one function used for transmitting network packets from said first protocols entity to said first network adapter into a first replacement function;

means for hooking at least one function used for transmitting network packets from said first network adapter to said first protocols entity into a second replacement function; and means for hooking at least one function used for receiving information about the status of the network interface implemented by said first network adapter into a third replacement function;

and wherein each said means for hooking performs a function of redirecting at least some of said function calls to original functions to corresponding replacement functions by altering address or pointer data in a programmatic interface of said original functions.

\* \* \* \* \*